(12) United States Patent
Matsunaga et al.

(10) Patent No.: US 6,771,043 B2
(45) Date of Patent: Aug. 3, 2004

(54) POWER TOOLS

(75) Inventors: Yutaka Matsunaga, Anjo (JP); Hitoshi Suzuki, Anjo (JP); Goushi Ishikawa, Anjo (JP)

(73) Assignee: Makita Corporation (JP)

( * ) Notice: Subject to any disclaimer, the term of this patent is extended or adjusted under 35 U.S.C. 154(b) by 37 days.

(21) Appl. No.: 10/142,251

(22) Filed: May 8, 2002

(65) Prior Publication Data

US 2002/0175656 A1 Nov. 28, 2002

(30) Foreign Application Priority Data

| May 9, 2001 | (JP) | ....................................... 2001-139093 |
| Sep. 21, 2001 | (JP) | ....................................... 2001-288375 |
| Dec. 25, 2001 | (JP) | ....................................... 2001-391797 |

(51) Int. Cl.⁷ ............................................... H02J 7/00
(52) U.S. Cl. ..................... 320/114; 320/132; 320/163
(58) Field of Search ............................... 320/114, 115, 320/132, 161, 162, 163, 164

(56) References Cited

U.S. PATENT DOCUMENTS

| 4,323,788 A | * | 4/1982 | Smith ........................... 307/66 |
| 5,773,977 A | * | 6/1998 | Dougherty ................... 324/429 |
| 6,055,168 A | * | 4/2000 | Kotowski et al. .............. 363/60 |
| 6,097,172 A | | 8/2000 | Podrazhansky et al. ....... 320/14 |
| 6,169,673 B1 | * | 1/2001 | McIntyre et al. .............. 363/59 |
| 6,346,795 B2 | * | 2/2002 | Haraguchi et al. ........... 320/136 |
| 6,518,733 B1 | * | 2/2003 | Schenkel et al. ............. 320/166 |

FOREIGN PATENT DOCUMENTS

| EP | 0 729 211 A2 | 8/1996 |
| EP | 0 944 153 A2 | 9/1999 |
| EP | 1 059 145 A2 | 12/2000 |
| JP | 04-32224 | 8/1992 |
| JP | 05-26278 | 4/1993 |
| JP | 05-162086 | 6/1993 |
| JP | 09-162086 | 6/1993 |
| JP | 07-1350 | 1/1995 |
| JP | 07-314342 | 12/1995 |
| JP | 08-290368 | 11/1996 |
| JP | 09-155755 | 6/1997 |
| JP | 11-138456 | 5/1999 |
| JP | 2000-176854 | 6/2000 |

OTHER PUBLICATIONS

European Search Report, Dec. 17, 2003.

* cited by examiner

Primary Examiner—Bao Q. Vu
(74) Attorney, Agent, or Firm—Orrick, Herrington & Sutcliffe

(57) ABSTRACT

Battery-powered tools may include battery 1 or battery pack BP and a drive source (e.g., motor M) for generating power using current supplied from the battery. A switch 3 may electrically connect the battery to the drive source. A voltage detector may detect the output battery voltage of the battery. Further, a processor 60, 210, a comparator 5 or another similar device preferably determines when a difference between (1) a first battery voltage detected at a first predetermined time period after the switch is turned OFF and (2) a second battery voltage detected at a second predetermined time after the first predetermined time period exceeds a predetermined value. This information may be utilized to determine whether to warn an operator of the battery powered tool that further operation using the battery 1 or battery pack BP should be discontinued.

16 Claims, 22 Drawing Sheets

Fully-charged Battery

Low Remaining Capacity Battery

Fully-charged Battery

Low Remaining Capacity Battery

Direction R₁

Direction R₂

POWER TOOLS

CROSS REFERENCE

This application claims priority to Japanese patent application number 2001-139093, filed May 9, 2001, Japanese patent application number 2001-288375, filed Sep. 21, 2001, and Japanese patent application number 2001-391797, filed Dec. 25, 2001, each of which are incorporated herein by reference as if fully set forth herein.

BACKGROUND OF THE INVENTION

1. Field of the Invention

The present invention relates to power tools, e.g., tightening tools. In one aspect of the present teachings, techniques are described for accurately detecting the remaining battery capacity of a battery utilized to drive the power tool. In another aspect of the present teachings, techniques are described for accurately terminating a fastening operation using a tightening tool.

2. Description of the Related Art

When the battery utilized with a battery powered-tool is discharged below a certain voltage level, the battery should be recharged. In order to inform the power tool operator that the battery is due for recharging, Japanese Examined Utility Model Publication No. 4-32224 describes a power tool that provides a warning when the battery has been discharged below a certain voltage level.

The known power tool includes a light-emitting diode connected to a comparator. A voltage that is proportional to the battery voltage is input to one terminal of the comparator and a fixed reference voltage is input to the other terminal of the comparator. When the voltage that is proportional to the battery voltage exceeds the reference voltage, the light-emitting diode is not illuminated. However, when the voltage that is proportional to the battery voltage falls below the reference voltage, the output of the comparator changes, thereby causing the light-emitting diode to illuminate and warn the power tool operator that the battery is due to be recharged.

SUMMARY OF THE INVENTION

However, the battery voltage will vary greatly depending on the usage status of the power tool, e.g., whether or not current is supplied from the battery to a drive source, and whether or not a load is applied to the drive source. As a result, the battery voltage that is input to the comparator also will greatly vary depending on the usage status of the power tool. Therefore, the known power tool can not accurately detect the remaining battery capacity.

It is, accordingly, one object of the present teachings to teach techniques for accurately detecting the remaining battery capacity of a battery, e.g., utilized with a power tool.

In one aspect of the present teachings, power tools may include battery 1, drive source 2, switch 3, voltage detector 4 and comparator 5, as shown in FIG. 1. A secondary battery, such as a nickel metal hydride battery or a nickel cadmium battery, may be utilized as battery 1. Battery 1 may be, e.g., disposed within the power tool or may be disposed in a detachable battery pack.

Drive source 2 generates power using current supplied from battery 1. For example, drive source 2 may include an electric motor. The power generated by the drive source 2 is transmitted to a drive shaft of the tool. Switch 3 may selectively couple drive source 2 to battery 1. Voltage detector 4 may detect the voltage of battery 1.

Comparator 5 may be utilized to determine whether the voltage of battery 1 (or a voltage representative of the battery voltage, such as a divided battery voltage) is greater than a reference voltage. If the voltage of battery 1 falls below a certain voltage level, the output of comparator 5 preferably changes in order to initiate a process for warning the power tool operator that the remaining battery capacity is insufficient to further operate the power tool in a reliable manner. For example, if the difference between (A) the battery voltage detected when a first predetermined time has elapsed after switch 3 is turned off and (B) the battery voltage detected when second predetermined time has further elapsed exceeds a predetermined value, the warning may be given to the power tool operator. Comparator 5 may be replaced with a microprocessor or any other device that can compare two voltages and provide a logic output based upon the two voltages.

The present techniques may utilize certain one or more characteristics of battery 1 in order to determine the appropriate timing for warning the power tool operator that the remaining battery capacity is insufficient (i.e., battery 1 should be recharged before further usage). As one representative example of an appropriate battery characteristic that may be advantageously utilized with the present teachings, it is noted that the voltage of a fully charged battery 1 will quickly recover when the supply of current to drive source 2 is stopped. On the other hand, the voltage of battery 1 having a relatively low remaining battery capacity will slowly recover when the supply of current to drive source 2 is stopped.

FIG. 2(a) and FIG. 2(b) show two representative examples of changes in battery voltage when switch 3 (see FIG. 1) is turned OFF after drive source 2 has been driven for a period of time. As shown in FIG. 2(a), the voltage of the fully charged battery quickly recovers when the supply of current to the drive source is stopped. On the other hand, as shown in FIG. 2(b), the voltage of the low remaining capacity battery (i.e., a battery that has been substantially discharged) recovers more slowly when the supply of current to the drive source is stopped. That is, when the battery is fully charged (or nearly fully charged), the rate of change in battery voltage approaches zero very quickly after the supply of current to the drive source is stopped. In other words, the battery voltage will substantially recover within a predetermined period of time after the supply of current to the drive source has been stopped. However, when the remaining capacity of the battery is relatively low, the battery voltage continues to slowly increase even after the predetermined period of time has elapsed, because the battery voltage recovers more slowly when the battery is substantially discharged.

Thus, by waiting a predetermined period of time after stopping the supply of current to drive source 2 to detect the voltage of battery 1, comparator 5 can accurately detect the remaining battery capacity and start the process of warning the power tool operator that the remaining battery capacity is insufficient for further use of battery 1.

In another aspect of the present teachings, power tools may include first switch 6, which is manually operated, and second switch 7, as shown in FIG. 3. First switch 6 may be utilized to selectively start and stop the supply of current to drive source 2. Second switch 7 is intermittently turned ON and OFF in order to increase or decrease the amount of current supplied to drive source 2 per unit time. Thus, first switch 6 may serve as the main switch for starting drive source 2. Second switch 7 may serve as a FET switch for pulse width modulation (PWM) control.

In the power tool of FIG. 3, when the operator switches first switch 6 to the OFF position, comparator 5 may compare the voltage of battery 1 (or a voltage representative of the battery voltage, such as a divided battery voltage) to the reference voltage. If first switch 6 is used as the main switch for starting drive source 2, the voltage of battery 1 is detected each time the operator turns off first switch 6 (i.e., each time a power tool operation is performed). If comparator 5 is actuated by first switch 6 and a motor is used as drive source 2, comparator 5 is preferably actuated only when the first switch 6 is switched to the OFF position under the conditions in which the current to the motor and the rotating speed of the motor do not vary, or do not substantially vary.

In another aspect of the present teachings, power tools may include first display 8, as shown in FIG. 4. First display 8 may be illuminated or otherwise actuated when comparator 5 starts the process of warning the power tool operator of insufficient (low) remaining battery capacity for further usage of battery 1. Thus, first display 8 may be utilized to warn the power tool operator to replace or recharge battery 1 at the appropriate time.

Optionally, when the operator is warned of the insufficient remaining battery capacity, the power tool also may actively cut or stop the supply of current to drive source 2. Thus, the power tool may prevent the operator from performing a power tool operation using a battery that has insufficient remaining battery capacity. This feature provides two advantages. First, damage to the battery from being overly discharged can be prevented. Second, the operator is prevented from performing a power tool operation when battery 1 may not be able to adequately supply current in order to complete the power tool operation.

In another aspect of the present teachings, power tools may further include second display 9 and second comparator 10, as shown in FIG. 5. Second comparator 10 may turn ON (actuate) second display 9 when the input voltage is less than the reference voltage. For example, the battery voltage may be measured when the current to motor 2 and the rotating speed of motor 2 do not vary, or do not substantially vary. If the battery voltage (or a voltage representative of the battery voltage, such as a divided voltage) is lower or less than the reference voltage, second display 9 may be illuminated or otherwise actuated in order to warn the power tool operator that battery 1 has insufficient remaining battery capacity.

In the power tool of FIG. 5, the remaining battery capacity is determined based upon the battery voltage measured at constant current discharge rate (i.e., when the current to motor 2 and the rotating speed or load of motor 2 do not vary, or do not substantially vary). In this case, if the remaining battery capacity is low or relatively low, second display 9 is activated (e.g., illuminated). Therefore, the operator can determine whether the battery has insufficient remaining battery capacity based upon whether or not first display 8 is illuminated or actuated and whether or not second display 9 is illuminated or actuated.

If first display 8 is not illuminated but second display 9 is illuminated, an abnormal state may be indicated. For example, even though the battery is sufficiently charged and the battery voltage quickly recovers after the current supply is stopped, the battery voltage is low. Accordingly, this state may indicate that a short circuit has occurred in one or more cells of battery 1.

Further, if first display 8 is illuminated but second display 9 is not illuminated, an abnormal state also may be indicated. For example, even though the battery voltage slowly recovers after the stop of the current supply, the battery voltage may be relatively high. Accordingly, this state may indicate that e.g., the internal impedance of battery 1 has increased, thereby indicating that battery 1 has acquired a "memory."

If both first display 8 and second display 9 are illuminated, the power tool operator may determine that the remaining capacity of battery 1 is insufficient. Therefore, the power tool operator can take appropriate action in accordance with the reason for the abnormal state of battery. For instance, if a short circuit exists in one or more cells of battery 1, battery 1 should be replaced. If battery 1 has acquired a memory, a battery refreshing process may be performed (e.g., battery 1 may be completely discharged before recharging battery 1). Naturally, if the remaining battery capacity of battery 1 is insufficient, battery 1 may be recharged.

According to another aspect of the present teachings, comparator 5 may detect the voltage of battery 1 after second switch 7 is switched OFF from the ON-state. Thus, when second switch 7 is switched OFF, the remaining battery capacity of battery 1 is detected. For example, a switching circuit may be provided in order to switch second switch 7 between the ON-state and the OFF-state.

For example, the switching circuit preferably turns ON second switch 7 when the power tool operator turns ON first switch 6. Further, the switching circuit may then turn OFF second switch 7 after the voltage supplied to drive source 2 has stabilized. When second switch 7 is turned OFF, the remaining battery capacity is detected. Therefore, the remaining battery capacity can be accurately detected, because the power tool operator does not stop the supply of current to drive source 2. If first switch 6 serves as the main switch, the remaining battery capacity is detected each time a power tool operation is started. Thus, it is possible to stop a power tool operation before initiating the power tool operation if battery 1 has insufficient battery capacity to perform the power tool operation.

If drive source 2 comprises a motor, the period of time between turning ON second switch 7 and turning OFF second switch 7 is preferably equal to or greater than the time constant of the motor. Therefore, a starting current will sufficiently flow to motor 2 and the battery voltage will notably decrease. As a result, after stopping the current supply to motor 2, the change in battery voltage is readily apparent, thereby enabling accurate detection of the remaining battery capacity.

In addition, if drive source 2 comprises a motor, the switching circuit preferably turns OFF second switch 7 before the motor starts rotating. In such power tools, the remaining battery capacity may be detected before the motor starts rotating. Therefore, the battery voltage will not be affected or influenced by the additional load caused by driving a rotating motor and the remaining battery capacity can be accurately detected.

Optionally, power tools may further include a third display and a third comparator. The third comparator may turn ON or illuminate the third display when the battery voltage, which is detected after the first switch is turned ON but before the second switch is turned ON, is lower or less than a predetermined (reference) voltage. If the battery voltage detected between turning ON the first switch and turning ON the second switch is lower than the predetermined (reference) voltage (i.e., if the no-load open voltage of the battery is lower than the predetermined (reference) voltage), the third display is turned ON or illuminated, thereby warning the power tool operator of the low remaining battery capacity. In this optional embodiment, because the remaining battery capacity also can be detected using the no-load open voltage of the battery, the accuracy of the detected remaining battery capacity may be increased.

Further, if the first display is not illuminated but the third display is illuminated, an abnormal state may be indicated. For example, even though battery 1 is sufficiently charged and the battery voltage quickly recovers after the current supply is stopped, the no-load open voltage is low. In this case, this state may indicate that a short circuit has occurred in one or more cells of battery 1.

Optionally, power tools may further include a fourth display and a fourth comparator. The fourth comparator may turn ON or illuminate the fourth display when the difference between (A) the no-load open voltage of the battery and (B) a voltage measured when a predetermined time has elapsed after the second switch has been turned ON exceeds a predetermined value. In this case, if the amount of voltage decrease when the drive source is started is greater than the predetermined value, the fourth display is actuated or illuminated in order to provide a warning of low remaining battery capacity. Thus, if the remaining battery capacity is also detected based upon the amount of voltage decrease when the drive source is started, the remaining battery capacity can be more accurately determined.

In another aspect of the present teachings, an abnormal state of the battery can be determined by whether or not the first display is illuminated and whether or not the fourth display is illuminated. For example, if the first display is not illuminated but the fourth display is illuminated, an abnormal state may be indicated. That is, even though the battery is sufficiently charged and the battery voltage quickly recovers after the current supply is stopped, the amount of voltage decrease is large when the drive source is actuated (started). Therefore, this state may indicate that the internal impedance of the battery has increased, thereby indicating a memory effect. In that case, the battery may be "refreshed" (i.e., completely discharged) before recharging the battery again in order to eliminate the memory effect.

In another aspect of the present teachings, power tools may include a battery, a drive source, a switch, a voltage detector, a timer and a comparator. The drive source may generate power using current supplied from the battery. The switch may be disposed in a circuit that couples the battery and the drive source. The voltage detector may detect the battery voltage. The timer may count the time after the switch has been turned OFF. If the time required for the battery voltage to reach a predetermined level after the switch has been turned OFF is longer (greater) than a predetermined time, the comparator may initiate a process for providing a warning of insufficient battery capacity.

When the battery is fully charged or relatively fully charged, the time required for the battery voltage to reach the predetermined level is relatively short, because the voltage of the battery will quickly recover. On the other hand, when the battery has a relatively low remaining battery capacity, the time required for the battery voltage to reach the predetermined level is relatively long, because the voltage of the battery will slowly recover. Therefore, if the battery voltage takes a relatively long amount of time to reach the predetermined voltage after the switch has been turned OFF (i.e., greater than the predetermined time), the remaining capacity of battery is probably low. In that case, the power tool operator should be warned of the low remaining battery capacity.

These aspects and features may be utilized singularly or in combination in order to provide improved battery powered tool. In addition, other objects, features and advantages of the present teachings will be readily understood after reading the following detailed description together with the accompanying drawings and the claims. Of course, the additional features and aspects disclosed hereinbelow also may be utilized singularly or in combination with the above-described aspects and features.

DETAILED DESCRIPTION OF THE INVENTION

In an another aspect of the present teachings relating to tightening tools, a socket may be attached to a distal end of the load shaft, and the head of a fastener may be disposed within the socket. Therefore, the rotation of the load shaft is transmitted to the fastener via the socket. The load shaft may be drive by a motor via an oil pulse unit or a hammer/anvil structure in order to produce an elevated torque output. If elevated torque is transmitted to the fastener when there is play between the socket and the fastener head, a force in a direction of loosening the fastener acts from the fastener to the socket due to a counter reaction to the elevated torque ("hammering action"). Therefore, the fastener is tightened by the load shaft repeating the cycle of normal rotation (rotation in the direction of tightening the fastener) and reverse rotation (rotation in the direction of loosening the fastener). Even after the fastener is tightened (i.e., the fastener is not substantially rotating), the load shaft repeats the cycle of normal rotation and reverse rotation due to the hammering action. In that case, the rotating speed of the load shaft may not decrease below a predetermined value in known tightening tools. Therefore, techniques are also taught herein for reliably and automatically stopping the motor during such hammering action.

Figure 21:
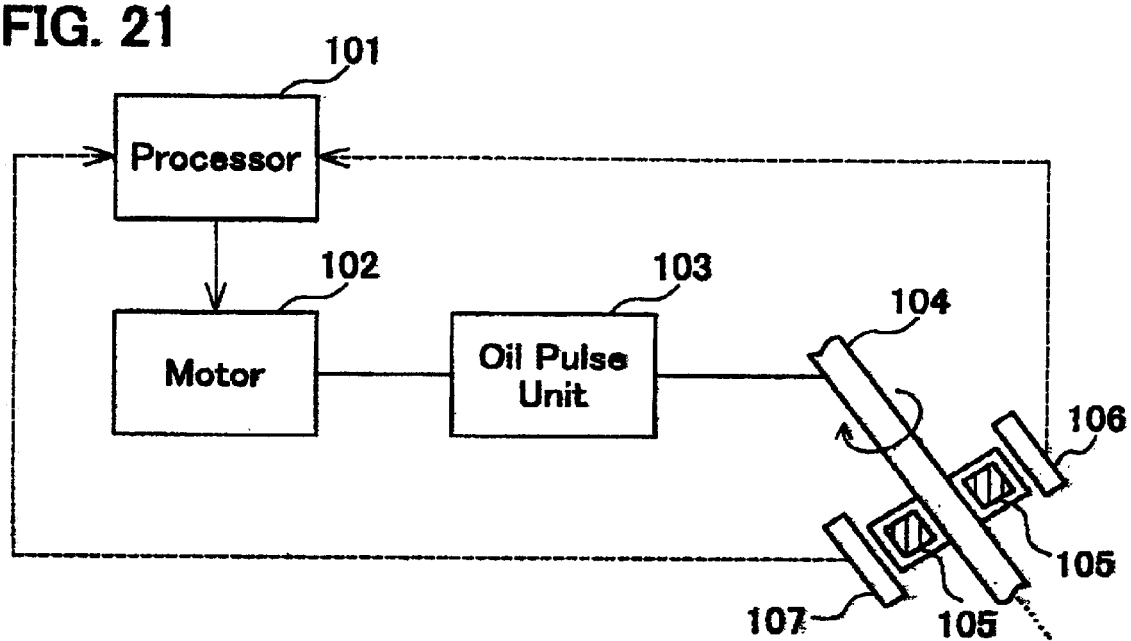
FIG. 21 schematically shows a block diagram of a tightening tool according to another embodiment of the present teachings.

Thus, in another embodiment of the present teachings, tightening tools may have a structure that is schematically shown in FIG. 21. The tightening tool of FIG. 21 transmits rotation of motor 102 to load shaft 104 via oil pulse unit 103. The load shaft 104 is arranged and constructed so as to engage a fastener (e.g., a bolt, a nut, and/or a screw), and the fastener is tightened by the rotation of load shaft 104.

Oil pulse unit 103 generates an oil pulse (elevated torque) by using oil pressure. The impact force of the oil pulse can be adjusted by adjusting the maximum pressure of oil pulse unit 103. Oil pulse unit 103 does not generate an oil pulse if the load acting on load shaft 104 is less than a predetermined value. As a result, an oil pulse is not generated in the initial tightening stage and the rotating torque of motor 102 is directly transmitted to load shaft 104. On the other hand, when the load acting on load shaft 104 exceeds the predetermined value, an oil pulse is generated. That is, as a fastener is further tightened, oil pulses are generated and, consequently, the fastener is tightened at an elevated torque.

A plurality of magnets 105 may be disposed at regular intervals around an outer surface of load shaft 104. The outer magnetic poles of magnets 105 are preferably disposed such that the South poles alternative with the North poles. When load shaft 104 rotates, magnets 105 integrally rotate with load shaft 104.

First magnetic sensor 106 and second magnetic sensor 107 may be disposed so as to face (e.g., directly oppose) the plurality of magnets 105. For example, first magnetic sensor 106 and second magnetic sensor 107 may be fixedly disposed with respect to the rotating magnets 105. In that case, when load shaft 104 rotates, first magnetic sensor 106 and second magnetic sensor 107 will not rotate. When detecting a North-pole magnetic field, magnetic sensors 106 and 107 each latch an output signal to a first (voltage) level. When detecting a South-pole magnetic field, magnetic sensors 106 and 107 each latch the output signal to a second (voltage) level. Naturally, the first level differs from the second level.

For example, when load shaft 104 rotates and consequently magnet 105 whose North pole faces outward comes close to each magnetic sensor 106, 107, the output signal of each magnetic sensor 106, 107 is switched to the first level. On the other hand, when load shaft 104 rotates and consequently magnet 105 whose South pole faces outward comes close to each magnetic sensor 106, 107, the output signal of each magnetic sensor 106, 107 is switched to the second level. Because the outer magnetic poles of magnets 105 are disposed such that the North poles alternate with the South poles, the output signals of each magnetic sensor 106, 107 alternately change between the first level and the second level when load shaft 104 rotates. That is, the output signal of each magnetic sensor 106, 107 varies in the form of a series of pulses.

In addition, if magnets 105 are disposed at regular intervals, the number of rotations of load shaft 104 can be determined, e.g., by counting the number of pulses of the output signal generated by sensors 106, 107. In other words, the number of rotations may be determined based upon the number of times that the output signal of each sensor 106, 107 changes between the first level and the second level. For instance, if four magnets 105 are disposed around the outer surface of load shaft 104 (e.g., at intervals of 90°), every time the output signal is switched to the first level twice, load shaft 104 has completed one rotation.

When load shaft 104 rotates in the direction of tightening a fastener (i.e., the normal or tightening direction), the output signal of first magnetic sensor 106 and the output signal of second magnetic sensor 107 are shifted by a first phase. On the other hand, when load shaft 104 rotates in the direction of loosening the fastener (i.e., the reverse direction), the output signals of magnetic sensors 106, 107 are shifted by a second phase. Therefore, the direction that load shaft 104 has been rotating can be determined by the phase difference between the output signals generated by sensors 106, 107.

Figure 22:
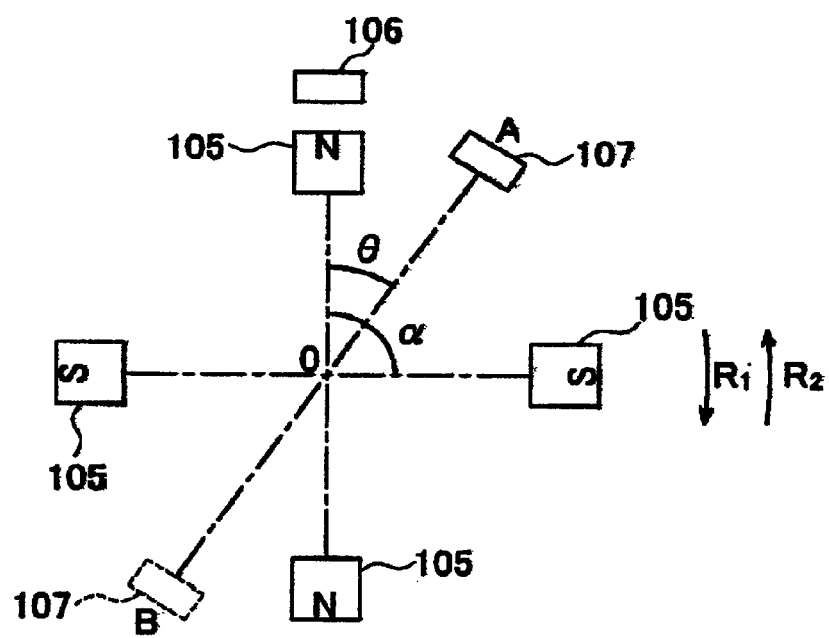
FIG. 22 schematically shows a representative example for disposing magnets, a first magnetic sensor and a second magnetic sensor in the tightening tool of FIG. 21.

In order to change the phase difference between the output signal of first magnetic sensor 106 and the output signal of second magnetic sensor 107 according to the direction of the rotation of load shaft 104, first magnetic sensor 106, second magnetic sensor 107, and magnets 105 may be disposed in the positional relationship shown in FIG. 22. Although four magnets 105 are disposed around the outer surface of load shaft 104 in FIG. 22, the number of magnets 105 is not limited four and other numbers of magnets 105 may be suitably utilized with the present teachings. Point O indicates the rotational center of load shaft 104.

Figure 23:
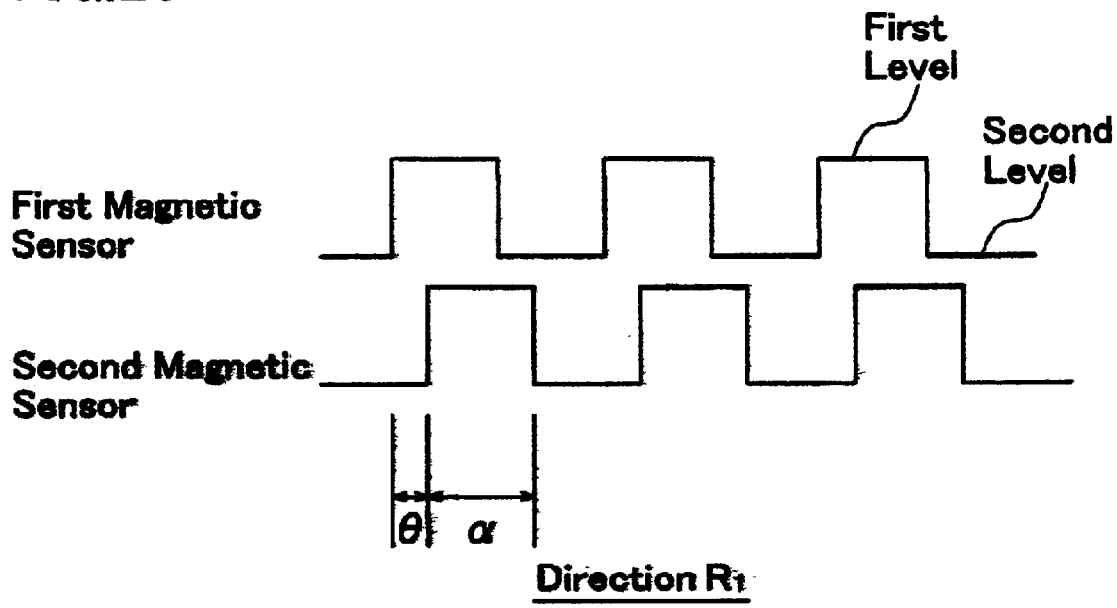
FIG. 23 shows timing charts of signals that are respectively output from the first magnetic sensor and second magnetic sensor of FIG. 23.
Figure 23:
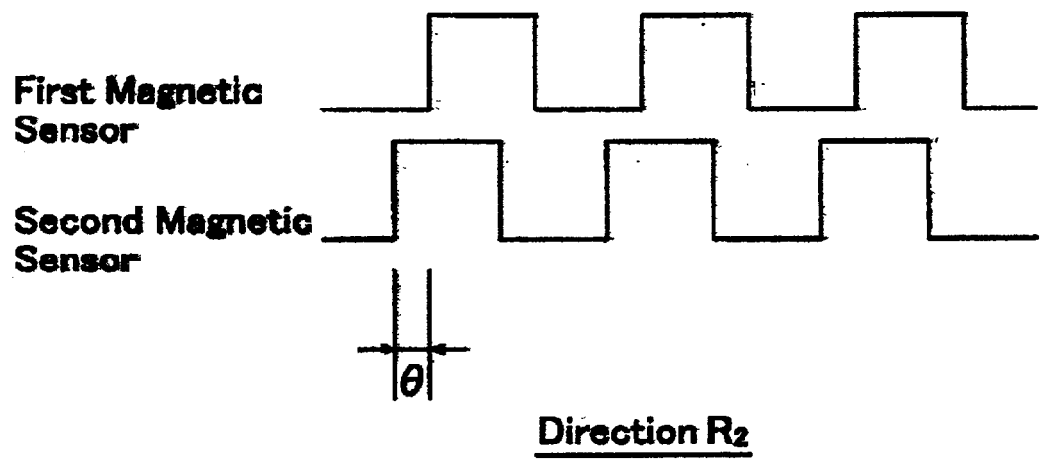

As shown in FIG. 22, angle θ is defined between first magnetic sensor 106 and second magnetic sensor 107, which is disposed at point A in FIG. 22. Angle θ is preferably less than angle α defined between adjacent magnets 105. In this case, when load shaft 104 rotates in direction $R_1$, the voltage level of the output signal of second magnetic sensor 107 switches after the voltage level of the output signal of first magnetic sensor 106 switches and then load shaft 104 further rotates by angle θ (see the upper chart of FIG. 23). On the other hand, when load shaft 104 rotates in direction $R_2$, the voltage level of the output signal of first magnetic sensor 106 switches after the voltage level of the output signal of second magnetic sensor 107 switches and then load shaft 104 further rotates by angle θ (see the lower chart of FIG. 23). Therefore, the phase difference between the output signal of first magnetic sensor 106 and the output signal of the second magnetic sensor 107 differs according to the rotational direction of load shaft 104. Accordingly, the direction in which load shaft 104 has rotated can be determined based upon this phase difference.

As shown in FIG. 22, even when second magnetic sensor 107 is disposed at point B, the phase difference between the output signal of first magnetic sensor 106 and the output signal of second magnetic sensor 107 is the same as when second magnetic sensor 107 is disposed at point A. That is, if central angle θ between first magnetic sensor 106 and second magnetic sensor 107 is not an integral multiple of central angle α between adjacent magnets 105, the phase difference between the outputs signals of sensors 106, 107 differs according to the rotational direction of load shaft 104.

Referring back to FIG. 21, microprocessor 101 may be coupled to magnetic sensors 106, 107. Based upon the phase difference between the output signal of first magnetic sensor 106 and the output signal of second magnetic sensor 107, microprocessor 101 can determine the rotational direction of load shaft 104. In addition, based upon the output signals from first magnetic sensor 106 or second magnetic sensor 107, microprocessor 101 can determine the number of rotations (or the amount of partial rotation) of load shaft 104. Therefore, microprocessor 101 can determine whether or not the rotation of the fastener has stopped. If the determination is YES, microprocessor 101 may stop current flow to motor 102 after a predetermined time has elapsed.

Accordingly, the fastener tightening torque can be prevented from becoming insufficient. Further, because motor 102 is automatically stopped after microprocessor 101 determines that the rotation of the fastener has stopped, the fastener is prevented from being tightened too firmly.

In another embodiment of the present teachings, microprocessor 101 may determine the timing to stop tightening the fastener by using the following representative method. For instance, microprocessor 101 may start a timer when motor 102 starts rotating. When the timer has counted to a predetermined time (number), microprocessor 101 determines that the tightening of the fastener has stopped. Subsequently, if microprocessor 101 determines, based upon the output signal of first magnetic sensor 106 and the output signal of second magnetic sensor 107, that load shaft 104 has rotated in the direction of loosening the fastener, the number of rotation(s) is stored. If microprocessor 101 determines, based upon the output signals of sensors 106, 107, that load shaft 104 has rotated in the direction of tightening the fastener, the timer is reset and restarted only when the number of rotation(s) in the direction of tightening is greater than the stored number of rotation(s) in the direction of loosening.

Accordingly, when load shaft 104 rotates in the direction of tightening the fastener, the timer is not reset unless the number of rotation(s) in the direction of tightening the fastener exceeds the stored number of rotation(s) in the direction of loosening the fastener. Therefore, if load shaft 104 has alternately rotated in the directions of tightening and loosening the fastener, due to hammering action, microprocessor 101 determines that the rotation of the fastener has stopped.

Immediately after determining that the rotation of the fastener has stopped according to the above described method, microprocessor 101 may stop the current supply to motor 102. In the alternative, when a predetermined time has elapsed after microprocessor 101 has determined that the rotation of the fastener has stopped, microprocessor 101 may stop the current supply to motor 102. For example, microprocessor 101 may start a second timer after determining that the rotation of the fastener has stopped, and then stop the current supply to motor 102 when the second timer has counted to the predetermined time (number).

In another embodiment of the present teachings, tightening tools may further include a sensor that detects oil pulses generated by oil pulse unit 103. For example, oil pulses may be counted that are generated after microprocessor 101 has determined that the rotation of the fastener has stopped. Then, when the count reaches a predetermined number, the current supply to motor 102 may be stopped.

In another embodiment of the present teachings, tightening tools may include a bearing that supports load shaft 104. The bearing may include an inner cylinder and an outer cylinder. Load shaft 104 may be affixed to the bearing via a through-opening that is defined within the inner cylinder. The outer cylinder may rotatably support the inner cylinder. Magnets may be disposed on an outer surface of the inner cylinder. A first magnetic sensor and a second magnetic sensor may be disposed on an inner surface of the outer cylinder.

In such a structure, the magnets and the two magnetic sensors are preferably disposed in a clearance defined between the inner cylinder and the outer cylinder. Therefore, the clearance between the magnets and the two magnetic sensors is kept substantially uniform, which improves the detection accuracy of the magnetic sensors. In addition, the magnets and the two magnetic sensors may be affixed to the bearing in advance, which eliminates the need to adjust the positions of the magnets and each magnetic sensor during the final assembly process.

In another embodiment of the present teachings, tightening tools may include a hammer and an anvil instead of the oil pulse unit. The motor may drive the hammer and the hammer may strike the anvil in order to generate an elevated torque. Thus, means for generating an elevated torque include, but are not limited to, an oil pulse unit and a hammer/anvil structure, but of which are known in the art and need not be described in further detail.

Figure 24:
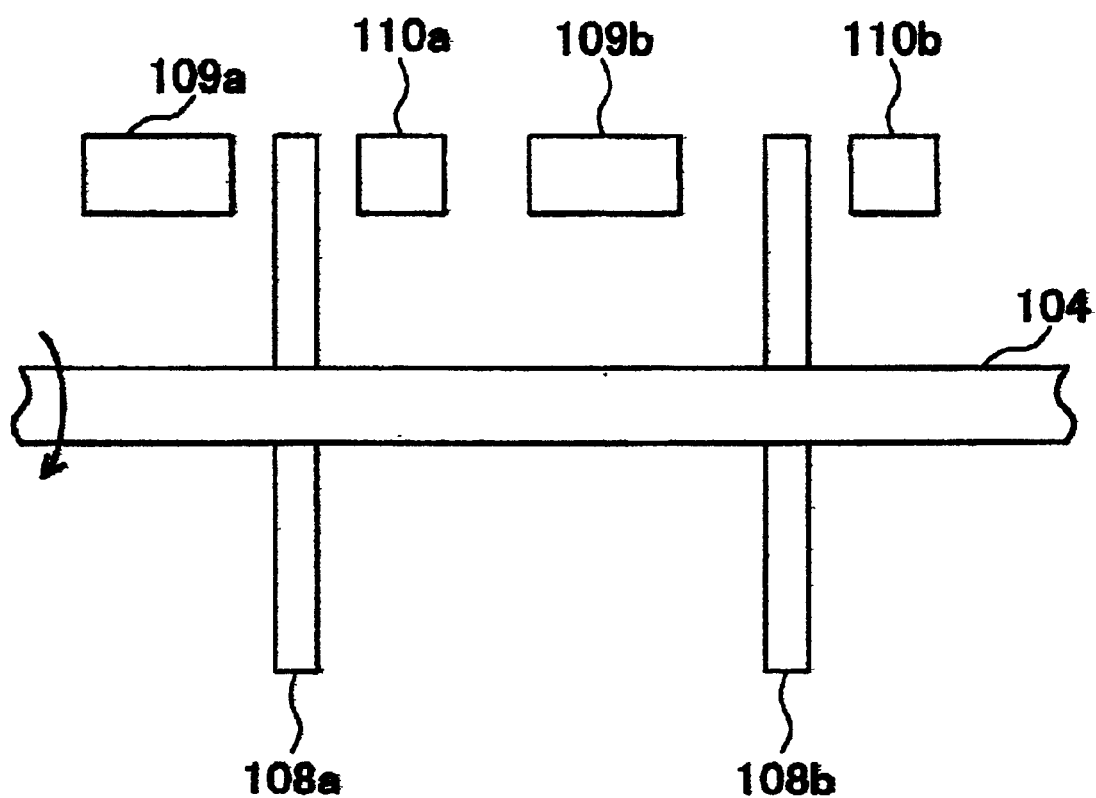
FIG. 24 schematically shows a structure for detecting the direction and the number of rotations of a load shaft by using a photo-interrupter.

In another embodiment of the present teachings, tightening tools may include, e.g., a photo-interrupter, which serves as a sensor for detecting rotation of the load shaft. For example, the photo-interrupter may optically detect a change in the rotational angle of the load shaft. FIG. 24 schematically shows a structure that detects the direction and the number of rotation(s) of the load shaft by using the photo-interrupter. Referring to FIG. 24, shielding plates 108a, 108b may be mounted on load shaft 104. A plurality of slits may be defined within each shielding plate 108a, 108b. Light-emitting element 109a and light-receiving element 110a may be disposed on opposite sides of shielding plate 108a. Similarly, light-emitting element 109b and light-receiving element 110b may be disposed on opposite sides of shielding plate 108b. The phase of the signal output from light-receiving element 110a and the phase of the signal output from light-receiving element 110b may be adjusted so as to differ according to the direction in which load shaft 104 rotates. Thus, the direction of rotation and the number of rotation(s) can be detected based upon this information.

In another embodiment of the present teachings, power tool may include a motor coupled to a means for generating an elevated torque. The elevated torque generating means may include an output shaft. Preferably, if a load acting on the output shaft is less than a predetermined value, the rotating torque generated by the motor is directly transmitted to the output shaft. On the other hand, if a load acting on the output shaft exceeds the predetermined value, an elevated torque is generated by the elevated torque generating means and is applied to the output shaft.

A load shaft may be connected to the output shaft. A plurality of magnets may be disposed around an outer surface of either the output shaft or the load shaft so that the magnets integrally rotate with the output shaft or the load shaft. Each magnet naturally will have a South pole and a North pole and the South poles are preferably disposed in an alternating relationship with the North poles. The magnets may be disposed a uniform (regular) intervals around the output shaft or the load shaft.

A first sensor may be fixedly disposed relative to the magnets, such that the first sensor will not rotate when the output shaft or load shaft rotates. The first sensor may latch its output signal to a first (voltage) level when detecting a North pole magnetic field and may latch its output signal to a second level when detecting a South pole magnetic field.

A second sensor also may be fixedly disposed relative to the magnets, such that the second sensor will not rotate when the output shaft or load shaft rotates. Similar to the first sensor, the second sensor may latch its output signal to the first level when detecting the North pole magnetic field and may latch its output signal to the second level when detecting the South pole magnetic field. Naturally, the first and second sensors preferably detect changes in magnetic fields as the magnets rotate with respect to the fixed first and second sensors.

The output signal of the first sensor and the output signal of the second sensor are shifted by first phase when the output shaft or load shaft rotates in a direction of tightening a fastener. Similarly, the output signal of the first sensor and the output signal of the second sensor are shifted by second phase when the output shaft or load shaft rotates in a direction of loosening the fastener.

A microprocessor or other means may be provided for determining (A) the direction of the rotation of the output shaft or load shaft based upon the phase difference between the output signal of the first sensor and the output signal of the second sensor, and (B) the number of rotations of the output shaft or load shaft based upon the output signals of the first sensor or second sensor. Preferably, the determining means stops the current supply to the motor when a predetermined time has elapsed after determining that the output shaft has stopped rotating.

The elevated torque generating means may include, e.g., a hammer driven by the motor and an anvil. The anvil may be driven in continuous contact with the hammer during normal operation and the hammer may strike the anvil in order to generate the elevated torque. The load shaft is preferably connected to the anvil. In the alternative, the elevated torque generating means may include an oil pulse unit driven by the motor and connected to the load shaft.

A bearing may rotatably support at least one of the output shaft or load shaft. In one representative embodiment of the present teachings, the bearing may include an outer cylinder rotatably supporting an inner cylinder. The inner cylinder may be affixed to the output shaft or load shaft via a through-opening defined within the inner cylinder. The magnets may be disposed on an outer surface of the inner cylinder and the first and second sensors may be disposed on an inner surface of the outer cylinder. Preferably, the bearing may support the output shaft of the elevated torque generating means.

A first central angle may be defined between the first and second sensors and a second central angle may be defined between adjacent magnets. Preferably, the first central angle is not an integral multiple of the second central angle.

When current supply to the motor is started, the microprocessor or other determining means preferably starts a timer. When the timer has counted to the predetermined time, the microprocessor or other determining means preferably determines that the rotation of the fastener has stopped. If the microprocessor or other determining means has determined that the output shaft or load shaft has rotated in the direction of loosening the fastener, the microprocessor or other determining means stores the number of rotations in the direction of loosening the fastener, preferably in a memory.

However, if the microprocessor or other determining means has determined that the output shaft or load shaft has rotated in the direction of tightening the fastener, the microprocessor or other determining means preferably re-sets and re-starts the timer only when the number of rotations in the direction of tightening the fastener exceeds the stored number of rotations in the direction of loosening the fastener.

The microprocessor or other determining means may start a second timer after determining that the rotation of the fastener has stopped. Further, the microprocessor or other determining means may stop the current supply to the motor when the second timer has counted to a predetermined time.

A sensor may detect the elevated torque generated by the elevated torque generating means and communicates output signals to the microprocessor or other determining means. When elevated torque is being generated, the sensor preferably outputs a detection signal to the microprocessor or other determining means. Then, the microprocessor or other determining means preferably stops the supply of current to the motor after the detection signal output from the sensor was input by a predetermined number of times after the microprocessor or other determining means has determined that the rotation of the fastener has stopped.

In addition or in the alternative to the above embodiments, power tools may include one or more rechargeable batteries. A drive source, such as the above-noted motor may generate power using current supplied from the battery or batteries. A switch may electrically connect and disconnect the battery with the drive source. Further, a voltage detector may detect the output battery voltage of the battery.

A microprocessor, a comparator or other means may be provided for determining when a voltage difference between (1) a first output battery voltage detected at a first predetermined time period after the switch is turned OFF and (2) a second output battery voltage detected at a second predetermined time after the first predetermined time period exceeds a first predetermined value. This information may be utilized to warn an operator of the power tool that the remaining battery capacity has become relatively low (i.e., the battery has been substantially discharged and requires recharging before further usage).

Optionally, the switch may include a first switch that is manually operable and a second switch that is intermittently turned ON and OFF in order to increase or decrease current per unit time supplied by the battery to the drive source. The microprocessor or other determining means may begin counting the first predetermined time period after the first switch has been turned OFF. Further, the microprocessor or other determining means may begin counting the first predetermined time period if the first switch was turned OFF when a substantially constant current was being supplied to the motor (drive source). In the alternative, the microprocessor or other determining means optionally may begin counting the first predetermined time period after the second switch has been turned OFF.

A first means may be provided for warning an operator that the battery has insufficient remaining battery capacity for further operation. The first warning means may be connected or coupled to the microprocessor or other determining means. Further, the microprocessor or other determining means may actuate the first warning means when the above-noted voltage difference exceeds the first predetermined value.

A second means may also be provided for warning an operator that the battery has insufficient remaining battery capacity for further operation. A microprocessor or other means for actuating the second warning means may be provided. Preferably, the second warning means is actuated when a third output battery voltage, which is detected when a substantially constant current is being supplied to the motor, is less than a second predetermined value.

A switching circuit may be utilized to repeatedly switch the second switch between an ON-state and an OFF-state. For example, the switching circuit may (A) turn ON the second switch when the first switch is turned ON and (B) turn OFF the second switch after the battery voltage applied to the drive source has stabilized. The time period between when the second switch is turned ON and when the second switch is turned OFF is preferably greater than or equal to the time constant of the motor (drive source). Optionally, the switching circuit may also (A) turn ON the second switch when the first switch is turned ON, and (B) turn OFF the second switch before the motor starts rotating. Further, the second switch may be maintained OFF when the microprocessor or other determining means actuates the first warning means.

A third means also may be provided for warning an operator that the battery has insufficient remaining battery capacity for further operation. Further, a microprocessor or other means for actuating the third warning means may be provided. The third warning means is preferably actuated when a fourth battery voltage, which is detected between the time that the first switch is turned ON and the second switch is turned ON, is less than a third predetermined value. Optionally, the second switch may be maintained OFF when the actuating means is actuating the third warning means.

A fourth means also may be provided for warning an operator that the battery has insufficient remaining battery capacity for further operation. Further, a microprocessor or other means for actuating the fourth warning means may be provided. Preferably, the fourth warning means may be actuated when a difference between (A) the fourth battery voltage (described above) and (B) a fifth battery voltage detected when a predetermined time has elapsed after the second switch is turned ON exceeds a fourth predetermined value. Optionally, the second switch may be maintained OFF when the actuating means is actuating the fourth warning means.

The first, second, third and fourth warning means may be one or more of a visual warning means, e.g., one or more LEDs or one or more LCDs, or an audible warning means, e.g., a buzzer or other type of speaker. For example, the first, second, third and fourth warning means may all be visual warning means, may all be audible warning means or may be a combination of visual and audible warning means. Further, two or more of the first, second, third and fourth warning means may be suitable combined in a single device, such as a LCD. The designer is free to select suitable warning means according to the present teachings.

Each of the additional features and method steps disclosed above and below may be utilized separately or in conjunction with other features, elements and method steps to provide improved battery powered tools and methods for making and using such battery powered tools. Detailed representative examples of the present teachings, which examples will be described below, utilize many of these additional features and method steps in conjunction. However, this detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the present teachings in the broadest sense, and are instead taught merely to particularly describe representative and preferred embodiments of the present teachings, which will be explained below in further detail with reference to the figures. Of course, features and steps described in this specification and in the dependent claims may be combined in ways that are not specifically enumerated in order to obtain other usual and novel embodiments of the present teachings and the present inventor expressly contemplates such additional combinations.

First Detailed Representative Embodiment

Figure 1:
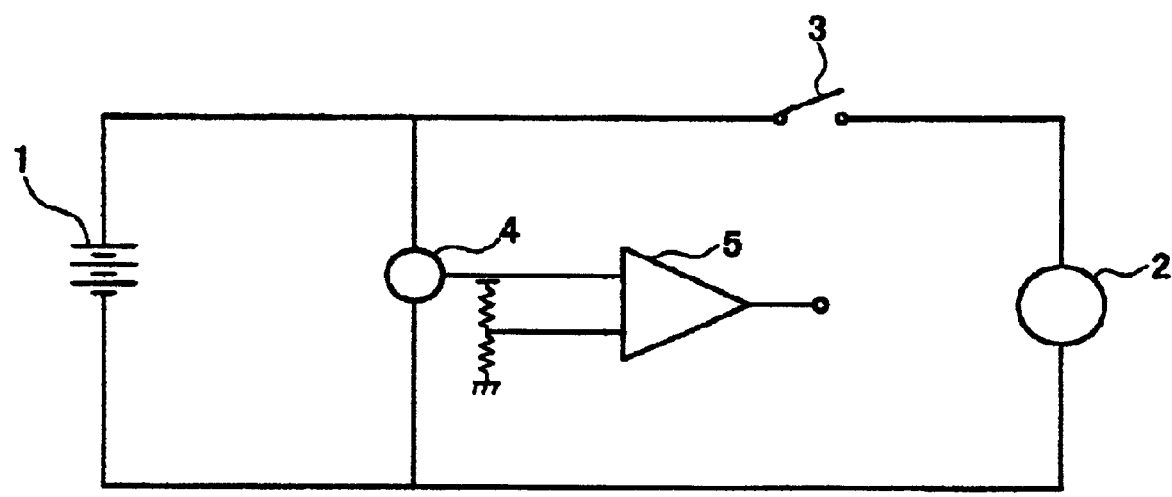
FIG. 1 is a block diagram schematically showing a representative circuit of a power tool according to one aspect of the present teachings.
Figure 2A:
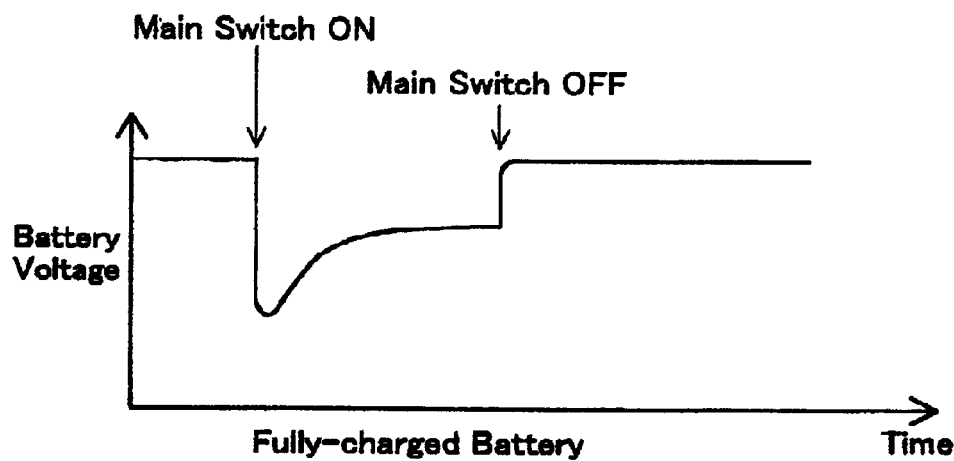
FIG. 2(a) is a graph schematically showing the voltage recovery characteristics of a fully charged battery.
Figure 2B:
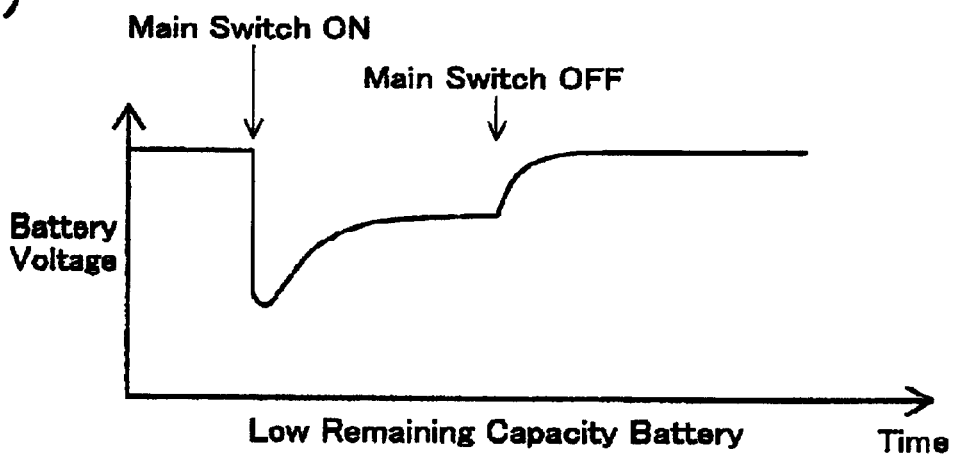
FIG. 2(b) is a graph schematically showing the voltage recovery characteristics of a battery having a relatively low remaining battery capacity.
Figure 3:
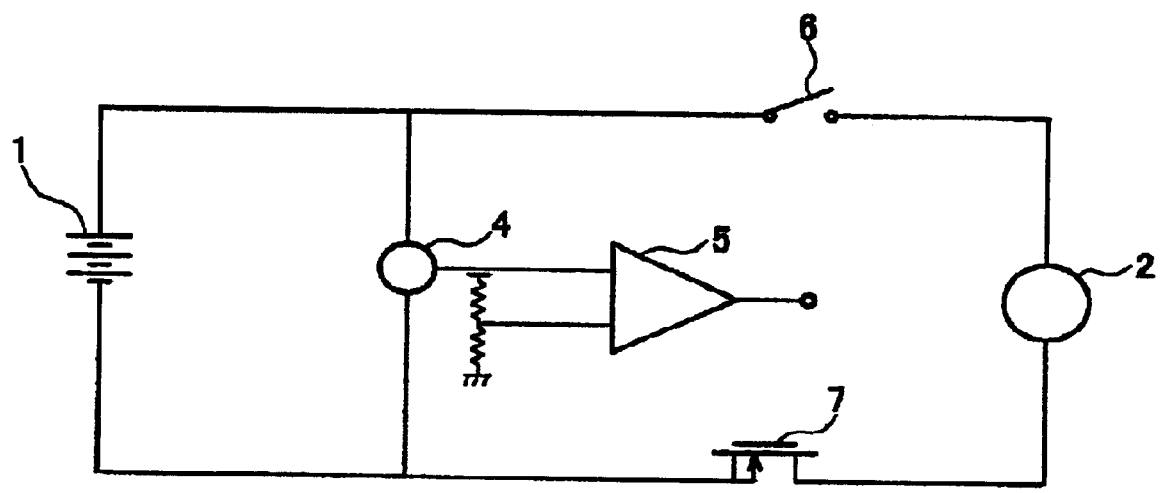
FIG. 3 is a block diagram schematically showing another representative circuit of another aspect of the present teachings.
Figure 4:
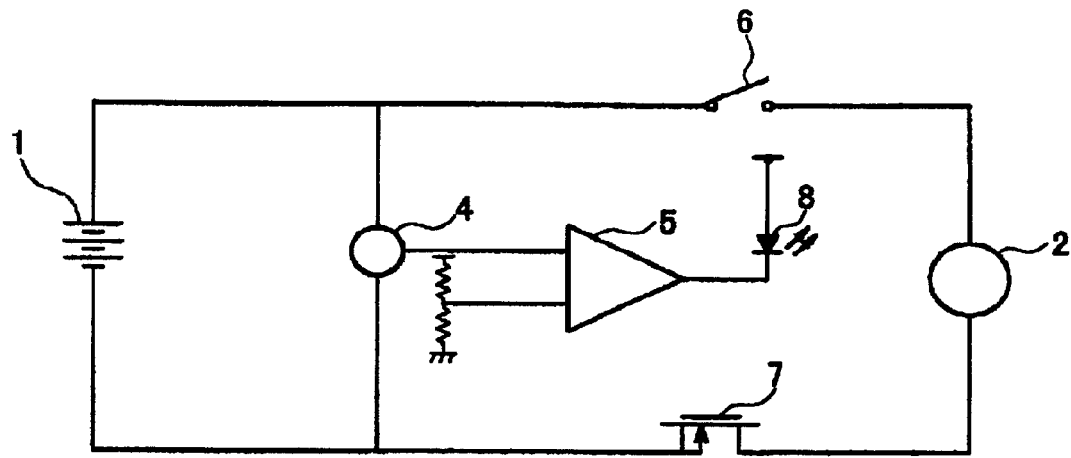
FIG. 4 is a block diagram schematically showing another representative circuit of another aspect of the present teachings.
Figure 5:
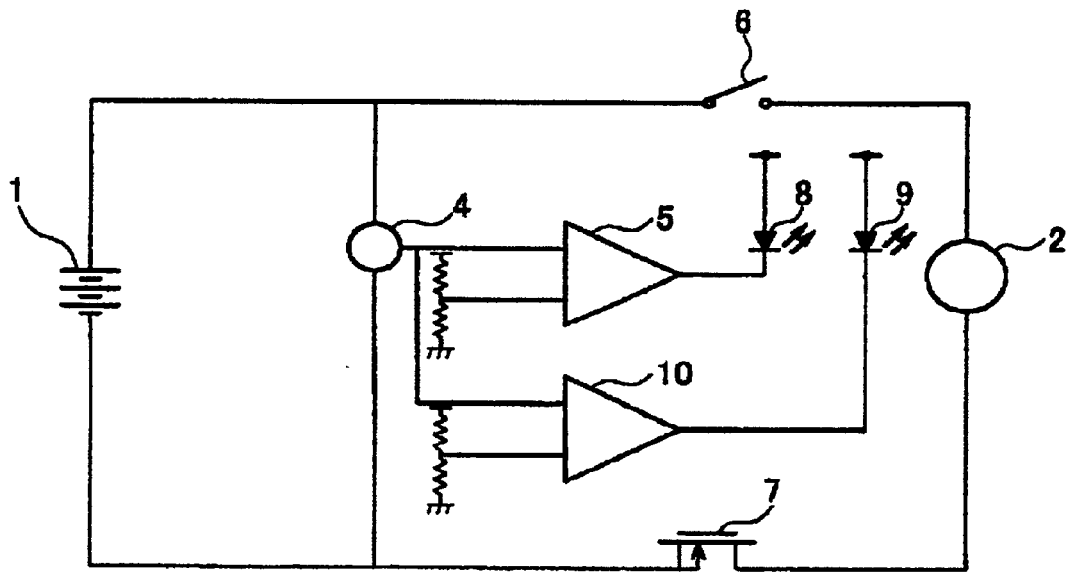
FIG. 5 is a block diagram schematically showing another representative circuit of another aspect of the present teachings.
Figure 6A:
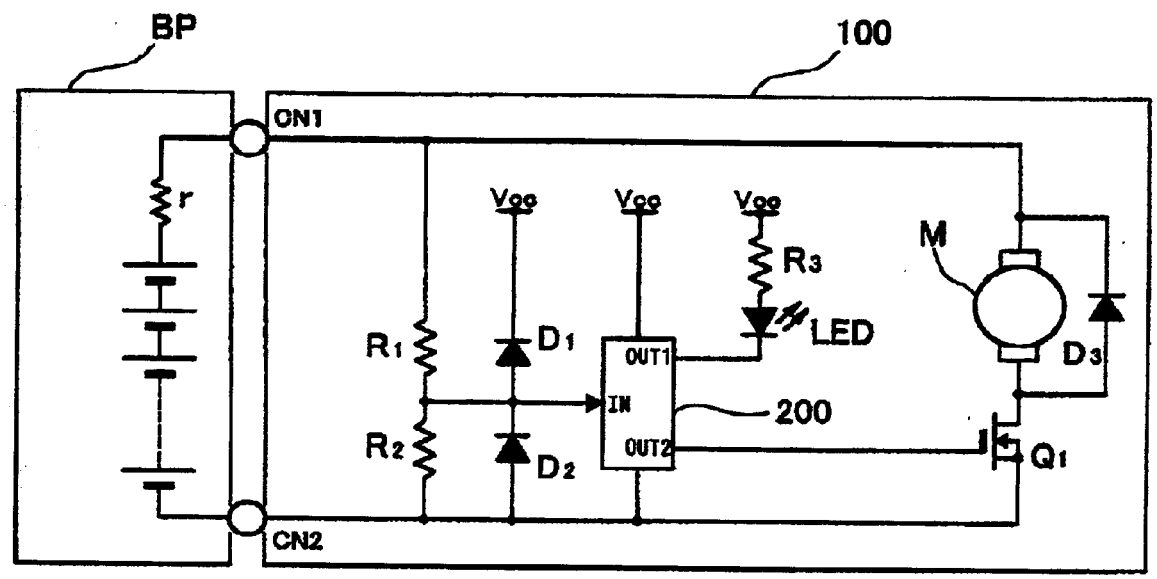
FIG. 6(a) is block diagram showing a representative circuit of a power tool according to a first representative embodiment of the present teachings.

FIG. 6(a) is a block diagram showing a representative control circuit for a power tool of a first representative embodiment. As shown in FIG. 6(a), the power tool may include battery pack BP and main body (housing) 100. Battery pack BP may include one or more battery cells, such as nickel metal hydride or nickel cadmium batteries, which can be recharged. Because a variety of battery pack designs may be utilized with the present teachings, it is not necessary to particularly describe battery pack BP. When battery pack BP is attached to main body 100, battery contacts of battery pack BP are connected to contacts CN1, CN2 of main body 100. When battery pack BP requires recharging, battery pack BP may be removed from main body 100.

Main body 100 may include motor M that is driven using current supplied from battery pack BP. IC 200 preferably detects, or receives signals indicating, the remaining battery capacity of battery pack BP. Main switch 226 (shown in FIG. 6(b)) may be operated or manipulated by the power tool operator in order to selectively drive motor M. One terminal of motor M is coupled to contact CN1 and the other terminal is coupled to contact CN2. Thus, by coupling motor M to battery pack BP via contacts CN1, CN2, motor M is driven using current that is supplied from battery pack BP. Zener diode D3 may be connected across both terminals of motor M. Switch Q1, which may be a field effect transistor (FET), may control the amount of current that is supplied to motor M and may be disposed between motor M and contact CN2. Output terminal OUT2 of IC 200 may be connected to switch Q1 (e.g., a gate terminal of the FET).

One terminal of each of resistors R1 and R2 may connected to input terminal IN of IC 200. The other terminal of resistor R1 may be connected to contact CN1 and the other terminal of resistor R2 may be connected to contact CN2. Diodes D1, D2 may be coupled between input terminal IN and resistors R1, R2. Thus, resistors R1, R2 may divide the output voltage of battery pack BP before being supplied to input terminal IN. Diode D2 may be utilized to remove (filter) negative elements from the divided voltage and the filtered voltage is supplied to input terminal IN of IC 200. Light-emitting diode LED is connected to output terminal OUT1 of IC 200 and to control power source Vcc via resistor R3.

Figure 6B:
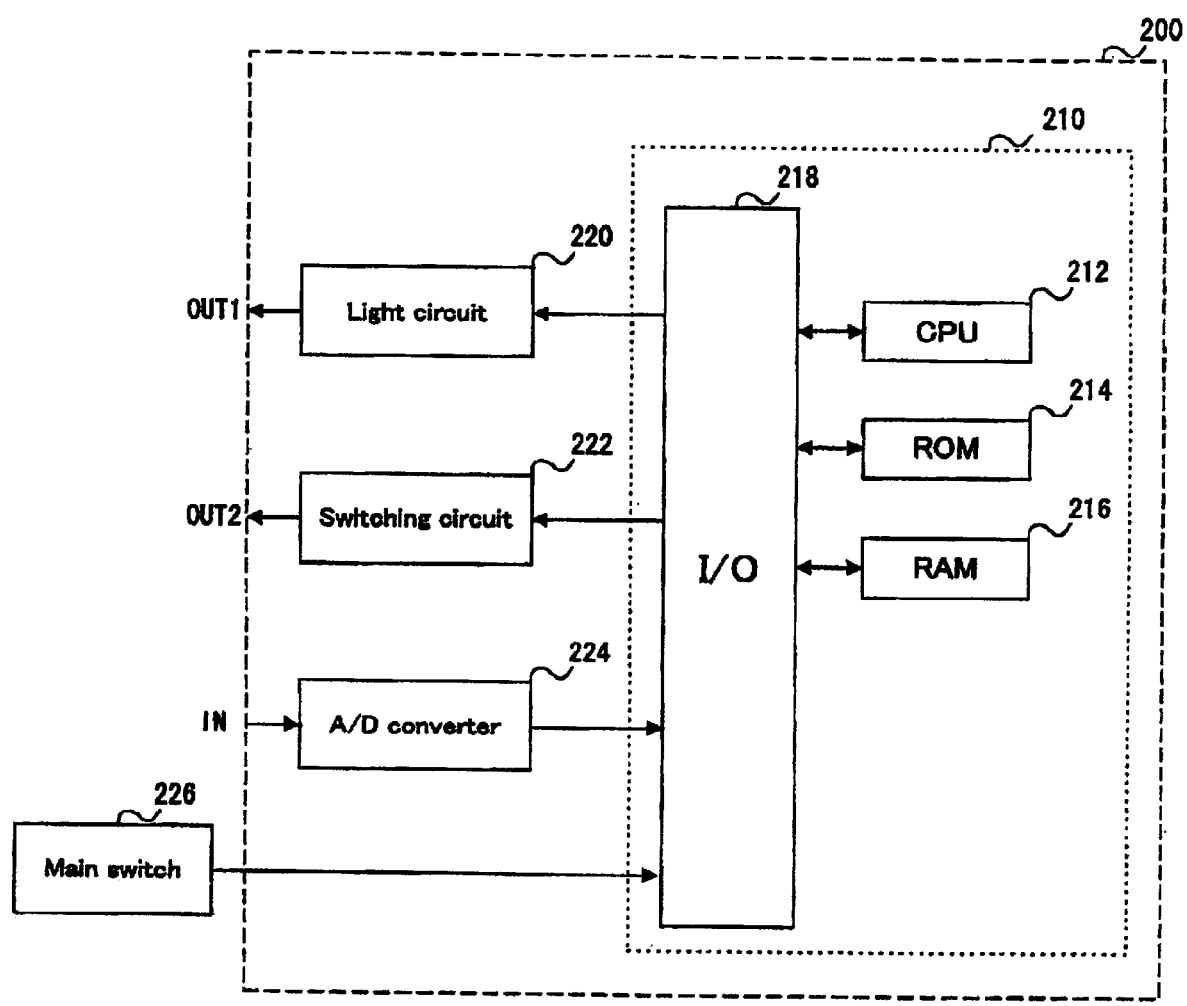
FIG. 6(b) is block diagram showing a representative circuit for IC 200 shown in FIG. 6(a).

FIG. 6(b) is a block diagram showing a representative circuit of IC 200 of FIG. 6(a). As shown in FIG. 6(b), IC 200 may include microcomputer (processor) 210, light circuit 220, switching circuit 222 and A/D converter 224. Microcomputer 210 may include, e.g., CPU 212, ROM 214, RAM 216 and I/O (interface) 216. ROM 214 may store, e.g., control programs for detecting the remaining battery capacity of battery pack BP.

Light circuit 222 may couple light-emitting diode LED to microcomputer 210. For example, light-emitting diode LED may be turned ON and OFF based upon output signals from microcomputer 210. Switching circuit 222 may couple switch Q1 to microcomputer 210. For example, switch Q1 may be turned ON and OFF using output signals from microcomputer 210. A/D converter 224 may couple resistors R1, R2 to microcomputer 210. Thus, the analog voltage supplied to input terminal IN may be converted into a digital form by A/D converter 224. For example, microcomputer 210 may receive a string of bits from A/D converter 224, which digital information represents the battery voltage. Main switch 226, which may be a trigger switch, also may be coupled to microcomputer 210.

Figure 7:
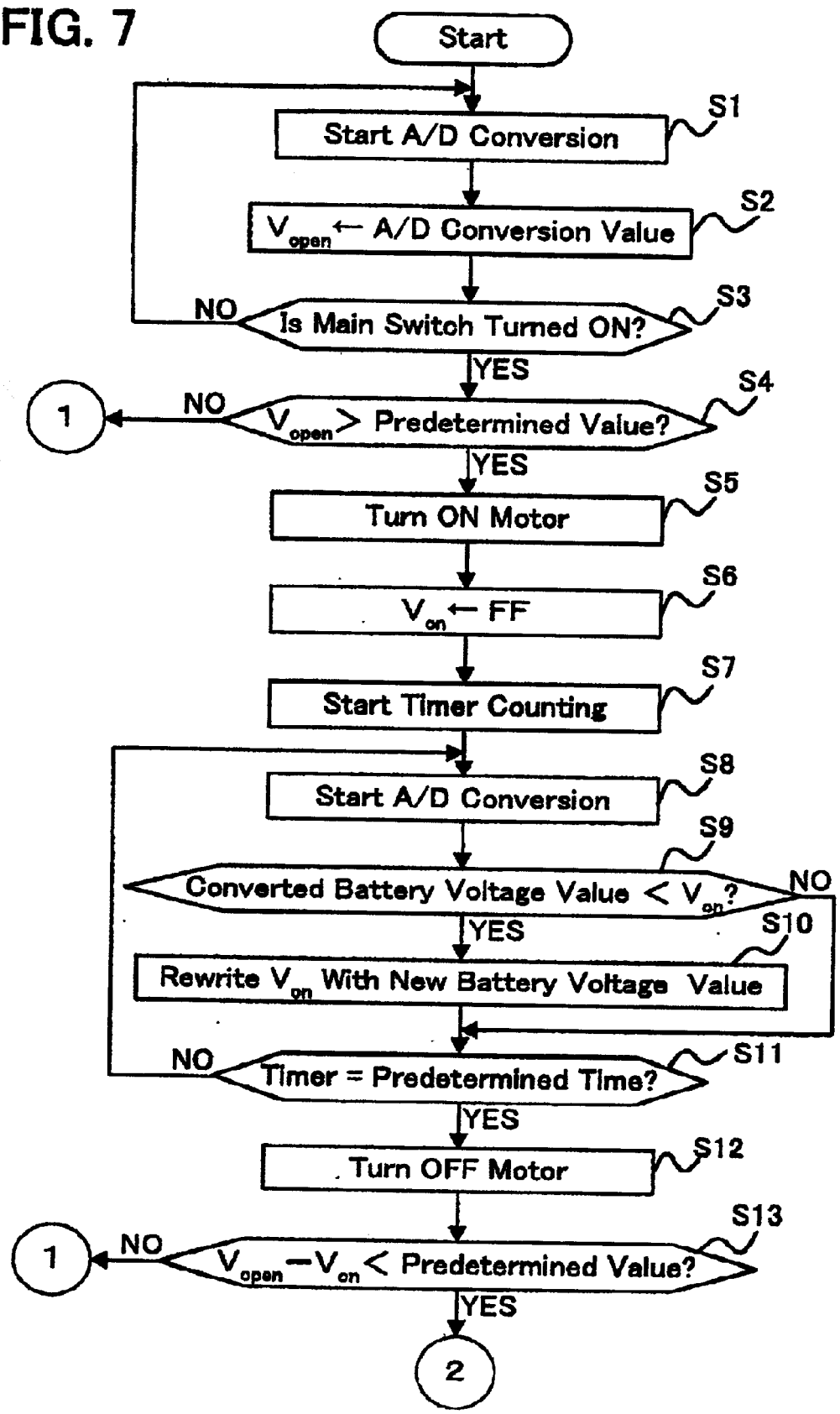
FIG. 7 is a flowchart of a representative process for determining remaining battery capacity before a motor begins rotating.
Figure 8:
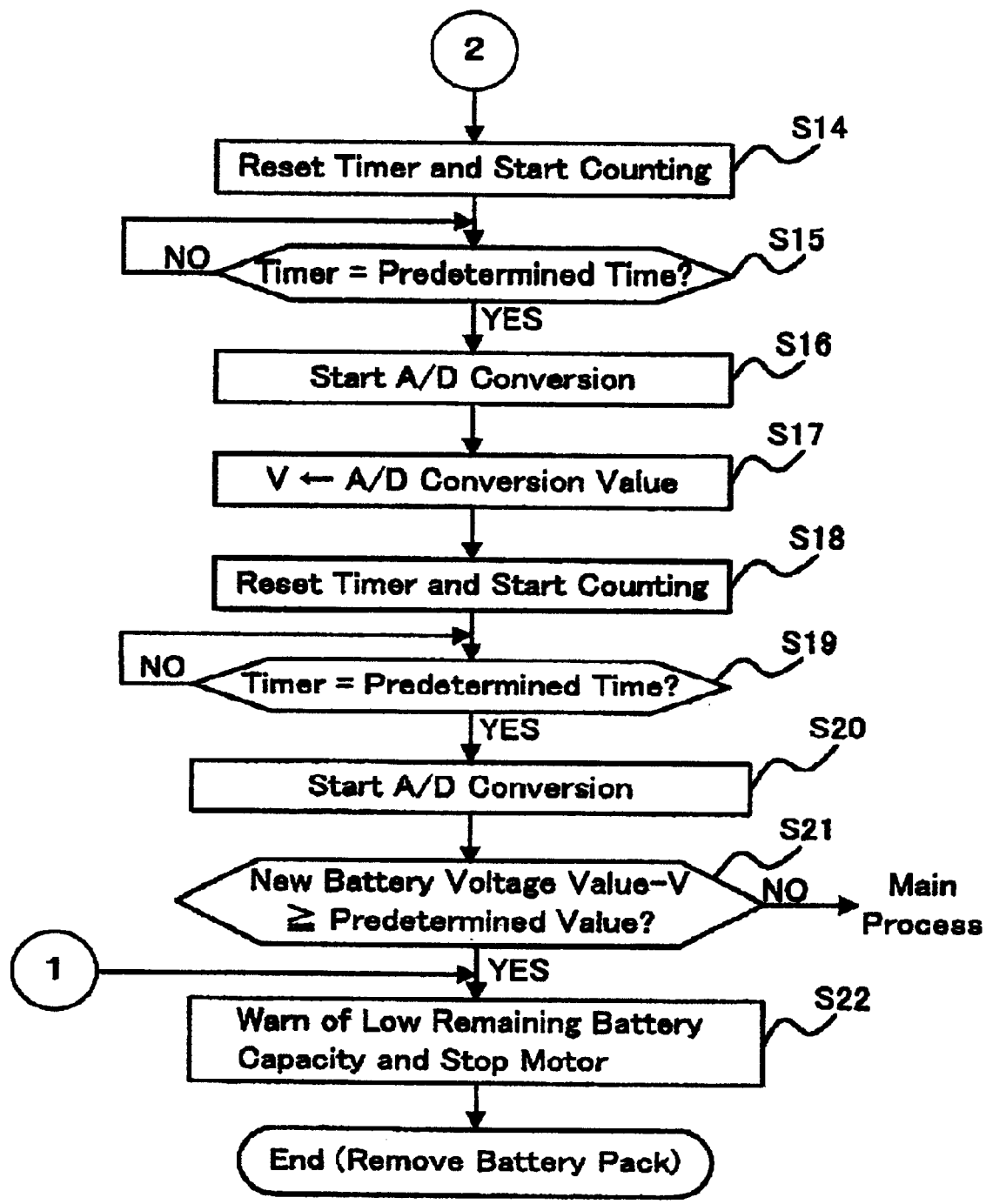
FIG. 8 is a continuation of the flowchart shown in FIG. 7.

A representative process that may be performed by IC 200 will now be described. When main switch 226 is turned ON, microcomputer 210 turns on/off switch Q1 in order to detect the remaining battery capacity before rotation of motor M is initiated. In addition, when main switch 226 is turned OFF, the remaining battery capacity is again detected. First, a representative process for detecting the remaining battery capacity before motor M begins rotating will be explained with reference to the representative flowcharts of FIGS. 7 and 8.

When battery pack BP is attached to main body 200, battery pack BP starts to supply current to IC 200. When IC 200 receives sufficient voltage to begin operation, A/D converter 224 converts the analog voltage provided by battery pack BP into a digital voltage value, as shown in step S1 of FIG. 7. The digital representation of the battery voltage, which represents a no-load open voltage Vopen, is then stored at a given address in RAM 216 (step S2). Subsequently, microcomputer 210 determines whether or not main switch 226 has been turned ON (step S3). If main switch 226 has not been turned ON, steps S1 to S3 may be repeated until main switch 226 is turned ON.

When main switch 226 is turned ON, microcomputer 210 determines whether or not the no-load open voltage Vopen is greater than a predetermined voltage (value) (step S4). If the no-load open voltage Vopen is less than or equal to the predetermined voltage (value), microcomputer 210 proceeds to step S22 shown in FIG. 8. On the other hand, if the no-load open voltage Vopen is greater than the predetermined voltage, microcomputer 210 proceeds to step S5.

In step S5, microcomputer 210 starts the supply of current to motor M, e.g., by outputting a signal from output terminal OUT2 to switch Q2. When current is supplied to motor M, initial value FF is stored in step S6 and represent a starting voltage Von (e.g., this value may be stored at a given address in RAM 216). Microcomputer 210 then starts a timer (step S7). Subsequently, the battery voltage supplied to input terminal IN is converted into a digital value by A/D converter 224 (step S8) and microcomputer 210 determines whether or not the new (present) battery voltage value is less than the starting voltage Von (step S9). If the new battery voltage value is less than the starting voltage Von, the stored starting voltage Von is rewritten (e.g., in RAM 216) using the new battery voltage value, which was A/D converted in step S8 (step S11).

Conversely, if the new battery voltage value is greater than or equal to the starting voltage Von, microcomputer 210 skips step S10 and proceeds to step S11. For example, if initial value FF is stored as the starting voltage Von in step S6 and initial value FF is the maximum voltage that can be stored as the starting voltage Von, the determination at step S9 will always be YES immediately after starting the supply of current to motor M. Consequently, step S10 will be performed.

Next, microcomputer 210 determines whether or not the timer, which started counting at step S7, has counted to a predetermined time (step S11). If the timer has not yet counted to the predetermined time, the process returns to step S8 in order to repeat steps S8 to S11. By repeating steps S8 to S11, the starting voltage Von will be rewritten (changed) to the minimum voltage that was supplied to input terminal IN during the predetermined time measured after starting the current supply to motor M.

When the timer has counted to the predetermined time (number), a signal may be outputted from output terminal OUT2 in order to turn OFF the current flow to motor M (step S12). For example, switch Q1 (FIG. 6a) may be opened in order to disable motor M. Therefore, current from battery pack BP is only supplied to motor M during the predetermined time period. The length of time that current is supplied to motor M (i.e., the predetermined time in step S11) is preferably set to be longer than the time constant of motor M, which is determined by the inductance and wire wound resistance of motor M.

Accordingly, because the battery voltage will substantially decrease due to the initial current that flows at the start of current supply to motor M, the voltage change after stopping the current supply to motor M is apparent. The predetermined time in step S11 is set so as to stop the supply of current to motor M before motor M starts rotating. Thus, the load necessary to rotatably drive motor M can be prevented from exerting an influence the battery voltage. Further, microcomputer 210 may execute a program to control the timing at which motor M is turned ON and OFF (steps S5, S12). Accordingly, it is possible to prevent erroneous detection caused by differences in the manner in which main switch 226 is operated (manipulated).

After the minimum value of starting voltage Von is stored in RAM 216, microcomputer 210 determines whether or not a (voltage) value, which is obtained by subtracting the starting voltage Von from the no-load open voltage Vopen (i.e., the amount of voltage decrease (Vopen-Von)), is lower or less than a predetermined value (step S13). If the amount of voltage decrease (Vopen-Von) is less than the predetermined value, the process proceeds to step S14 of FIG. 8. If the amount of voltage decrease (Vopen-Von) is greater than or equal to the predetermined value, the process proceeds to step S22 of FIG. 8.

In step S14, the timer is reset in order to start counting again. Microcomputer 210 waits until the timer finishes counting a predetermined time (step S15). The predetermined time period of step S15 is preferably different from the predetermined time period of step S11. The predetermined time is waited in steps S14 to S15 in order to prevent detection of noise from battery pack BP (i.e., noise caused when the supply of current to motor M is stopped).

When the timer has counted the predetermined time, the battery voltage is supplied to input terminal IN and is A/D converted by A/D converter 224 (step S16). The value obtained by the conversion, which represents a recovery voltage V, is stored in RAM 216 (step S17). Then, the timer is reset to start counting (step S18). Microcomputer 210 waits until the timer has counted to a predetermined time (step S19). The predetermined time of step S19 is preferably different from the respective predetermined times of steps S11, S15. The time that will be waited in steps S18, S19 may be selected so as to detect or evaluate the battery voltage recovery characteristics. For example, as discussed further above, when the battery is fully charged (or nearly fully charged), the battery voltage will quickly recover after current flow to motor M is stopped. On the other hand, the battery voltage will recover more slowly when the remaining battery capacity is relatively low.

When the predetermined time has been reached in step 19, the battery voltage is supplied to input terminal IN and is again A/D converted (step S20). Subsequently, microcomputer 210 subtracts the recovery voltage V stored in step S17 (i.e., the battery voltage detected when the predetermined time of step S15 elapsed after stopping the current supply to motor M) from the voltage detected in steps S19, S20 (i.e., the battery voltage detected when the predetermined times in steps S15, S19 elapsed after stopping the current supply to motor M). Then, microcomputer 210 may determine whether or not the amount of voltage recovery (i.e., recovered voltage) is greater than or equal to a predetermined value (Step S21).

If the amount of voltage recovery is smaller or less than the predetermined value (i.e., if the amount of voltage change over the elapsed period of time is relatively small), the process may proceed to a main (control) process. The main control process may include a process for driving motor M by operating main switch 226, e.g., a process for selectively driving motor M under PWM control according to the amount or degree that main switch 226 has been pulled. In addition, because the predetermined time of above-described step 11 (e.g., about 3 milliseconds in the first representative embodiment) and the sum of the predetermined times of steps S15, S19 (e.g., about 7 milliseconds in the first representative embodiment) may be very short, the power tool operator will not notice the start of the current supply to motor M in step S5 and the stop of the current supply to motor M in step S12. Accordingly, the operator will likely perform power tool operations without even noticing that the remaining battery capacity detection process is being performed.

When the amount of voltage recovery is greater than or equal to the predetermined value, a warning of low remaining capacity of battery pack BP is given and the supply of current to motor M is prohibited (step S22). For example, microcomputer 210 may output a signal from output terminal OUT1, thereby turning ON light-emitting diode LED, and may prohibit a drive signal from being sent from output terminal OUT2 to switch Q1, even if main switch 226 is actuated (i.e., prohibiting current from flowing to motor M). As a result, after step S22, the operator cannot continue to operate the power tool unless the battery pack BP is replaced with another battery pack BP.

Figure 9A:
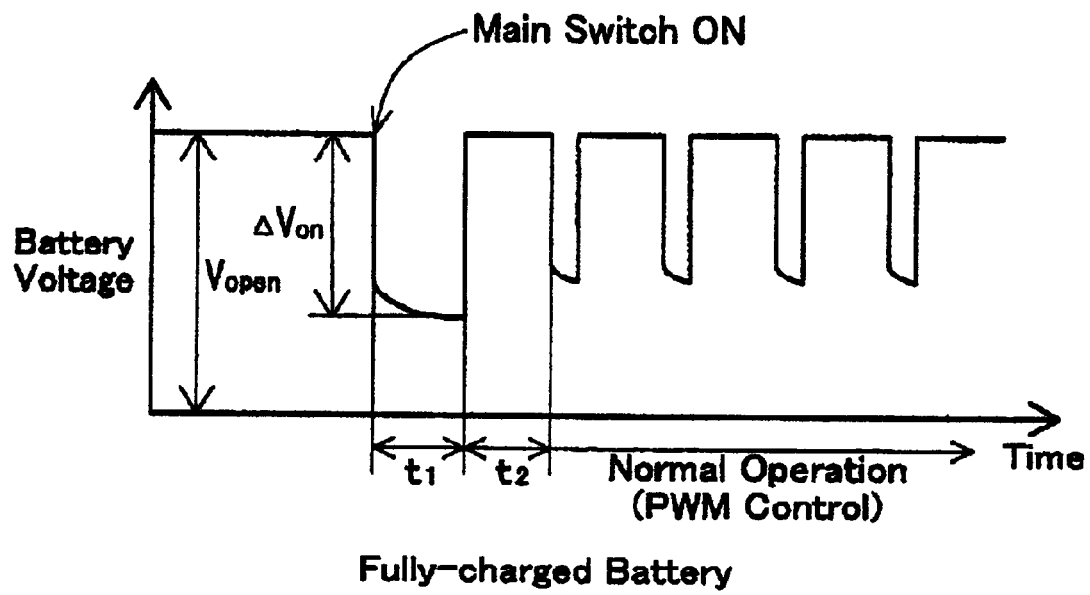
FIG. 9(a) is a graph schematically showing changes in battery voltage of the power tool according to the first representative embodiment when the battery is fully charged.
Figure 9B:
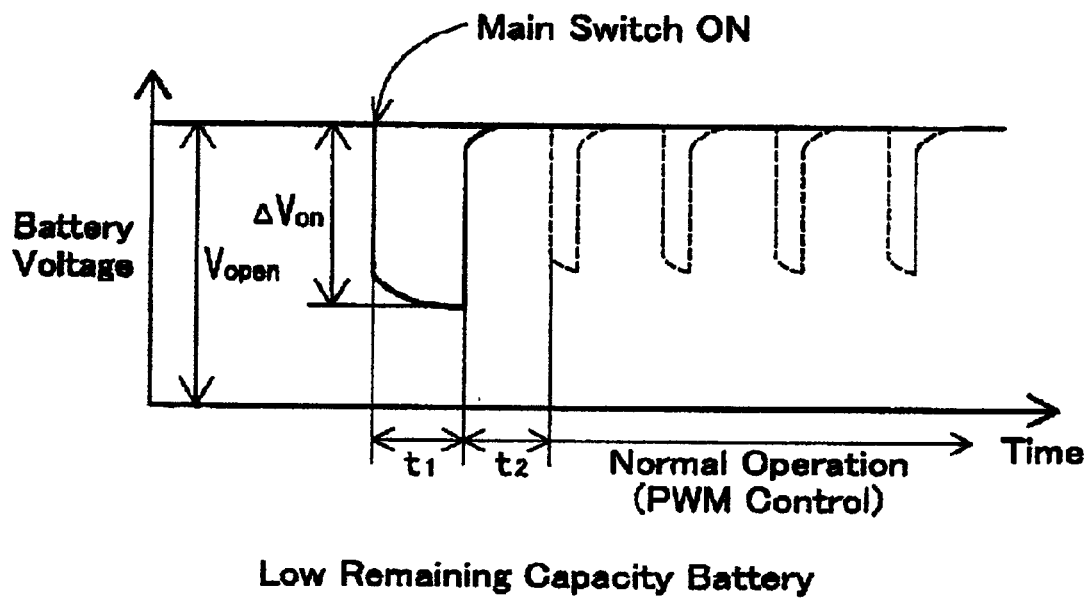
FIG. 9(b) is a graph schematically showing changes in battery voltage of the power tool according to the first representative embodiment when the remaining battery capacity is relatively low.

The operation of the power tool will be described in detail with reference to FIG. 9(a) and FIG. 9(b) with respect to the above described-process for detecting the remaining battery capacity. FIG. 9(a) shows changes in the output voltage of battery pack BP over time when battery pack BP is fully charged, or relatively fully charged. FIG. 9(b) shows changes in the output voltage of battery pack BP over time when the remaining battery capacity of battery pack BP is relatively low.

First, the changes in the voltage of battery pack BP over time when battery pack BP is filly charged will be explained with reference to FIG. 9(a). When main switch 226 is turned ON (actuated), current is supplied to motor M for the predetermined time period t1 (i.e., the predetermined time period in step S11, which is about 3 milliseconds). As a result, the voltage of battery pack BP will decrease as time elapses due to the load placed upon the battery cells within battery pack BP.

When the predetermined time period t1 elapses after main switch 226 has been turned ON, the supply of current to motor M is stopped. When the supply of current to motor M is stopped, the voltage of battery pack BP quickly recovers, as shown in FIG. 9(a), because battery pack BP is fully charged. In this case, the results of step S4 (determination based upon the no-load open voltage), step S13 (determination based upon the amount of voltage decrease at the time of startup) and step S21 (determination based upon the voltage recovery characteristics) will all indicate that the remaining battery capacity is sufficient for further usage. Consequently, the supply of current to motor M is re-started when the predetermined time period t2 (i.e., the sum of the predetermined time periods of steps S15 and S19, which is about 7 milliseconds) has elapsed after stopping the current supply to motor M. Accordingly, current is then supplied under PWM control to motor M after the re-start. The PWM control may be performed based upon the amount or degree that main (trigger) switch 226 has been pulled.

Next, the changes in the voltage of battery pack BP over time when the remaining capacity of battery pack BP is relatively low will be explained with reference to FIG. 9(b). In the example shown in FIG. 9(b), the result of step S4 (determination based upon the no-load open voltage) and the result of step S13 (determination based upon the amount of voltage decrease) will indicate that the remaining battery capacity is sufficient for further usage. However, the result of step S21 (determination based upon the voltage recovery characteristics) will indicate that the remaining battery capacity is low. Although the results of steps S4 and S13 indicate that battery pack BP does not have any significant problems, such as a short circuit in one or more battery cells and/or an increased internal resistance, the remaining battery capacity has substantially decreased. However, even when the remaining battery capacity of battery pack BP is low, current will be supplied to motor M in response to the actuation of main switch 226. Therefore, it is preferably to prevent further current supply to motor M in order to avoid possibly damaging the battery cell(s) within battery pack BP.

After the predetermined time period t1 has elapsed (i.e., the predetermined time period in step S11, which is about 3 milliseconds), the current supply to motor M is stopped. When the current supply to motor M is stopped, the voltage of battery pack BP recovers relatively slowly, as shown in FIG. 9(b), because the remaining battery capacity of battery pack BP is relatively low. Therefore, the result of step S21 (determination based upon the voltage recovery characteristics) indicates a low remaining battery capacity. Consequently, LED is turned ON, and the supply of current to motor M will be prevented (i.e., motor M cannot be driven) even if main switch 226 is turn ON (actuated).

As a result, it is possible to prevent further use of the power tool when battery pack BP has low remaining battery capacity. Furthermore, if the remaining battery capacity of battery pack BP is detected each time that main switch 226 is operated, the remaining battery capacity is prevented from being depleted during a power tool operation.

Figure 10:
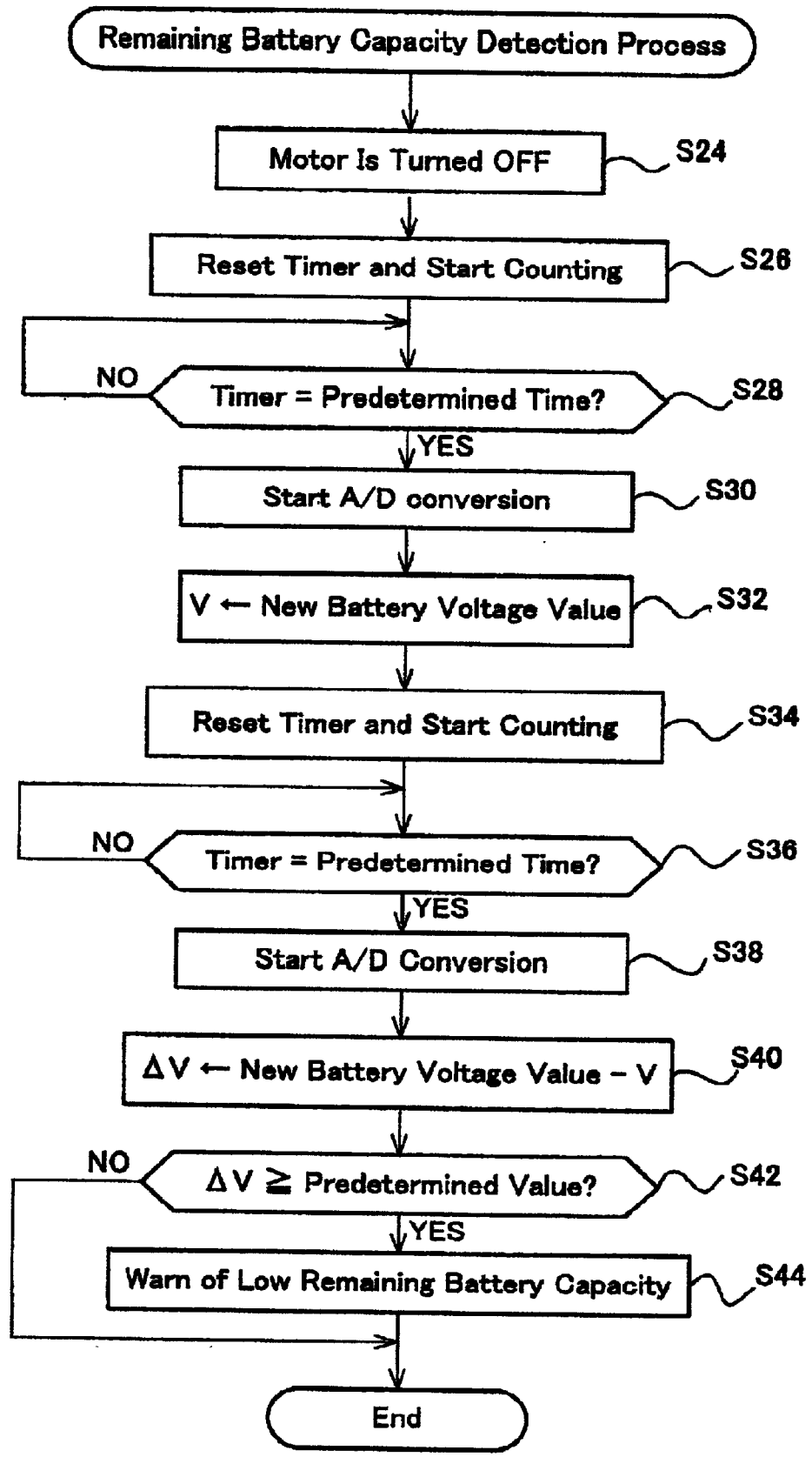
FIG. 10 is a flowchart of a representative process for determining remaining battery capacity after a power tool operation has been completed.

Next, a representative process for determining the remaining battery capacity, which process may be performed by IC 200 when main switch 226 is turned OFF after the power tool operation is finished, will be described with reference to FIG. 10. When main switch 226 is turned OFF, microcomputer 210 stops the supply of current to motor M (step S24). Then, the timer starts counting (step S26). The process waits until the timer has counted to the predetermined time (step S28), which predetermined time may be the same as the predetermined time of step 15.

When the timer has counted to the predetermined time, the voltage of battery pack BP is A/D converted (step S30), and the new (present) battery voltage value generated by the A/D conversion is stored as recovery voltage V (step S32). Thereafter, the timer is set again in order to start counting (step S34). The process then waits until the timer counts to the predetermined time (step S36), which predetermined time may be the same as the predetermined time of step S19.

When the timer has finished counting, the voltage of battery pack BP is A/D converted (step S38). Then, the recovery voltage V, which was stored in step S32 (i.e., the battery voltage detected when the predetermined time period of step S28 elapsed after stopping the current supply to motor M), is subtracted from the new battery voltage detected in step S38 (i.e., the battery voltage detected when the sum of the predetermined time periods of steps S28 and S36 elapsed after stopping the current supply to motor M). The result of this subtraction is then stored in RAM 216 as a voltage change value ΔV (step S40).

If the voltage change value ΔV exceeds a predetermined value, a warning indicating low remaining battery capacity is given (step S44). If not, the remaining battery capacity detection process ends. The warning at step S44 may be given, e.g., by outputting a signal from output terminal OUT1 in the same manner as step S22 of FIG. 8. In this case, light-emitting diode LED may be turned ON, thereby informing the power tool operator that the remaining battery capacity of battery pack BP has substantially decreased and battery pack BP requires recharging.

In the above-described first representative embodiment, IC 200 may include general-purpose microcomputer 210. However, the first embodiment is only an example of the present teachings and a variety of circuits having the same functions as IC 200 (microcomputer 210) can also be obtained by combining a variety of electronic devices (e.g., a comparator and a timer).

Further, in the above-described first representative embodiment, when the no-load open voltage is lower or less than or equal to the predetermined voltage and/or when the amount of voltage decrease during the start-up time is greater than or equal to the predetermined amount, the LED is turned ON (illuminated) without determining the remaining battery capacity of battery pack BP based upon the voltage recovery characteristics. In addition, the current supply to motor M is actively stopped or prohibited. However, the present teachings are not limited to such an example.

For example, the remaining battery capacity of battery pack BP may be determined based upon the voltage recovery characteristics even when the no-load open voltage is lower than or equal to the predetermined voltage and/or when the amount of voltage decrease during the start-up time is greater than or equal to the predetermined amount. In this case, the state of LED is preferably changed according to the specific criterion upon which the microcomputer has determined that the remaining battery capacity of battery pack BP has substantially decreased (i.e., insufficient remaining battery capacity). Thus, the operator can be visually informed of the specific reason for stopping usage of battery pack BP. In the alternative, a plurality of LEDs may be utilized to indicate the plurality of specific reasons for stopping further usage of battery pack BP.

If the no-load open voltage indicates low remaining battery capacity when the voltage recovery characteristics indicate sufficient remaining battery capacity, the battery pack may be in an abnormal state, such as a short circuit within one or more battery cells. If the amount of the voltage decrease at the start-up time indicates a low remaining battery capacity when the battery recovery characteristics indicate sufficient remaining battery capacity, the internal impedance of the battery may have increased due to deterioration of the battery cell(s) or the internal impedance of the battery cell(s) may have increased due to a mechanical failure of an electrical contact or memory effects.

The above-described remaining battery capacity detection techniques are applicable to any type of battery-powered tools. For example, the present techniques can advantageously be utilized with battery-powered tightening tools, e.g., screwdrivers, torque wrenches, and impact wrenches for tightening fasteners (e.g., screws, nuts and bolts). In such battery-powered tools, if the tightening operation is performed when the remaining battery capacity is relatively low, insufficient tightening torque may be applied to the fastener, which may degrade the quality of the tightening operation. Thus, the remaining battery capacity detection techniques according to the present teachings prohibit the tightening operation from being performed when the remaining battery capacity is low, thereby ensuring high quality tightening operations.

Second Detailed Representative Embodiment

The second representative embodiment of the present teachings will now be described with reference to FIGS. 11–20(b). The second representative embodiment provides an example of applying the above-described remaining battery capacity detection techniques to soft impact wrenches, which are one type of tightening tools. In addition, techniques for stopping the fastening operation at an appropriate timing are also taught.

In the second representative embodiment, similar to the first representative embodiment, the remaining battery capacity may be detected before motor M begins rotating after the main switch has been turned ON. In addition, the remaining battery capacity may be detected again when the current supply to motor M is stopped after a tightening operation is completed. The remaining battery capacity before motor M begins rotating may be detected in the same manner as the first representative embodiment. However, the method for detecting the remaining battery capacity after the power tool operation is completed differs from the first representative embodiment. Therefore, further explanation of the remaining battery capacity detection before the motor M begins rotating can be omitted, and it is only necessary to provide further explanation concerning detecting the remaining battery capacity after the power tool operation is completed.

Before proceeding with a discussion of further battery capacity detection techniques and techniques for stopping the fastening operation using an impact tool (wrench), some additional background information is in order. Generally speaking, a fastener (e.g., bolt, nut or screw) may be disposed within a socket of the tightening tool. The socket is typically attached to a distal end of a load (drive) shaft. The load shaft is then forcibly rotated in order to tighten the fastener within or to a workpiece.

Usually, a small amount of play exists between the socket and the fastener. Therefore, when the load shaft tightens the fastener, a cycle (repetition) of normal rotation (rotation in a tightening direction) and reverse rotation (rotation in a loosening direction) is typically repeated due to a reaction (hammering action) that is produced when the impact force of the load shaft is transmitted to the fastener. Consequently, even after the fastener has been adequately tightened, the socket (i.e., load shaft) of known power tools may continue repeat the cycle of normal rotation and reverse rotation due to the hammering action.

In order to overcome this problem of impact wrenches, the soft impact wrench of the second representative embodiment determines when the load shaft has, in fact, stopped rotating by detecting the rotating direction of the load shaft and changes in the rotational angle of the load shaft. Then, when it is determined that the rotation of the load shaft has stopped, the motor is automatically stopped (e.g., current flow to the motor is terminated). After determining that the rotation of the load shaft has stopped and stopping the supply of current to the motor, the soft impact wrench may then detect the remaining battery capacity.

Figure 11:
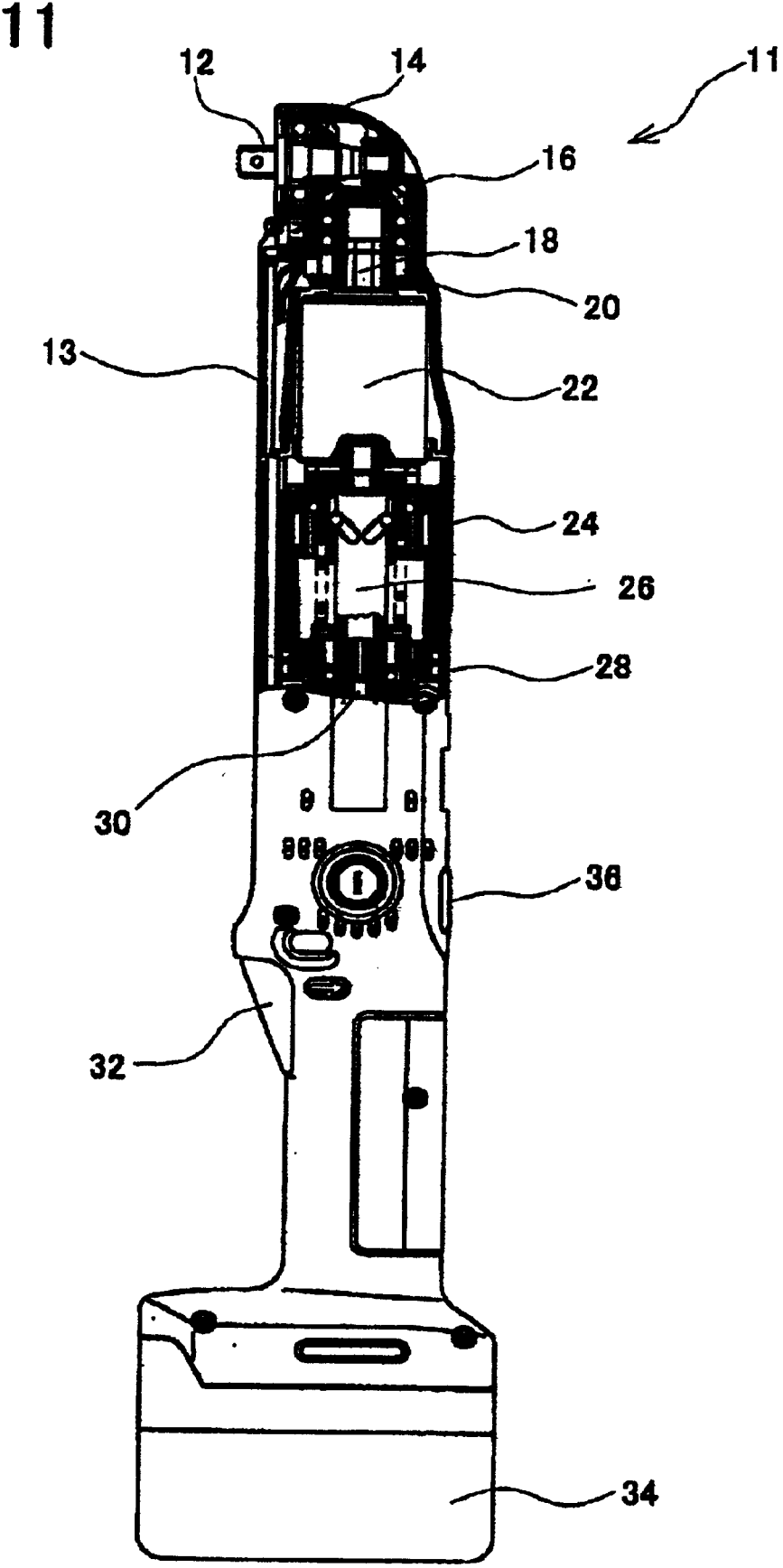
FIG. 11 is a partial cross-sectional view showing a right angle, soft impact wrench according to a second representative embodiment of the present teachings.

FIG. 11 shows a second representative embodiment of the present teachings, which is right-angle soft impact wrench 11 having a motor (not shown in FIG. 11, but shown as motor M in FIG. 16) that is disposed within housing 13. Planetary gear mechanism 28 is connected to output shaft 30, which is coupled to motor M. Oil pulse unit 22 is connected to output shaft 26 of planetary gear mechanism 28 via cushioning mechanism 24.

Oil pulse unit 22 is a known device that causes output shaft 18 to instantaneously produce a large impact force (oil pulse) by using the pressure of the oil that is disposed within oil pulse unit 22. The impact force can be controlled by adjusting the maximum pressure of the oil disposed within oil pulse unit 22. Thus, a predetermined tightening torque can be produced. Cushioning mechanism 24 may be, e.g., a known mechanism (e.g., described in Japanese Unexamined Utility Model No. 7-31281) for preventing the impact force, which is produced by the oil pulse, from being directly transmitted to planetary gear mechanism 28.

Output shaft 18 of oil pulse unit 22 is pivotally supported by bearing device 20, and bevel gear 16 is disposed on a distal end of output shaft 18. Bevel gear 16 engages another bevel gear 14, which is disposed on one end of spindle 12. Although spindle 12 is pivotally supported perpendicular to output shaft 18 in this embodiment (i.e., thereby defining a "right-angle" impact wrench), spindle 12 may be pivotally supported at a variety of angles relative to output shaft 18. Thus, the present teachings are not limited in this respect. A socket (not shown) may be utilized to engage the head of a fastener and may be fixedly or removably attached to the other end of spindle 12.

When motor M rotates, the output rotational speed of motor M is reduced by planetary gear mechanism 28 and the reduced output rotational speed is transmitted to oil pulse unit 22. In oil pulse unit 22, the load on spindle 12 (output shaft 18) is low at the initial stage of tightening. Therefore, the rotational energy generated by motor M is directly transmitted to spindle 12 without generating an oil pulse. As a result, spindle 12 will continuously rotate, thereby continuously tightening the fastener. On the other hand, after the fastener has been substantially tightened, the load on spindle 12 (output shaft 18) will increase. At that time, oil pulse unit 22 will generate oil pulses in order to produce an elevated torque and more firmly tighten the fastener using the impact force generated by the oil pulses.

Figure 12:
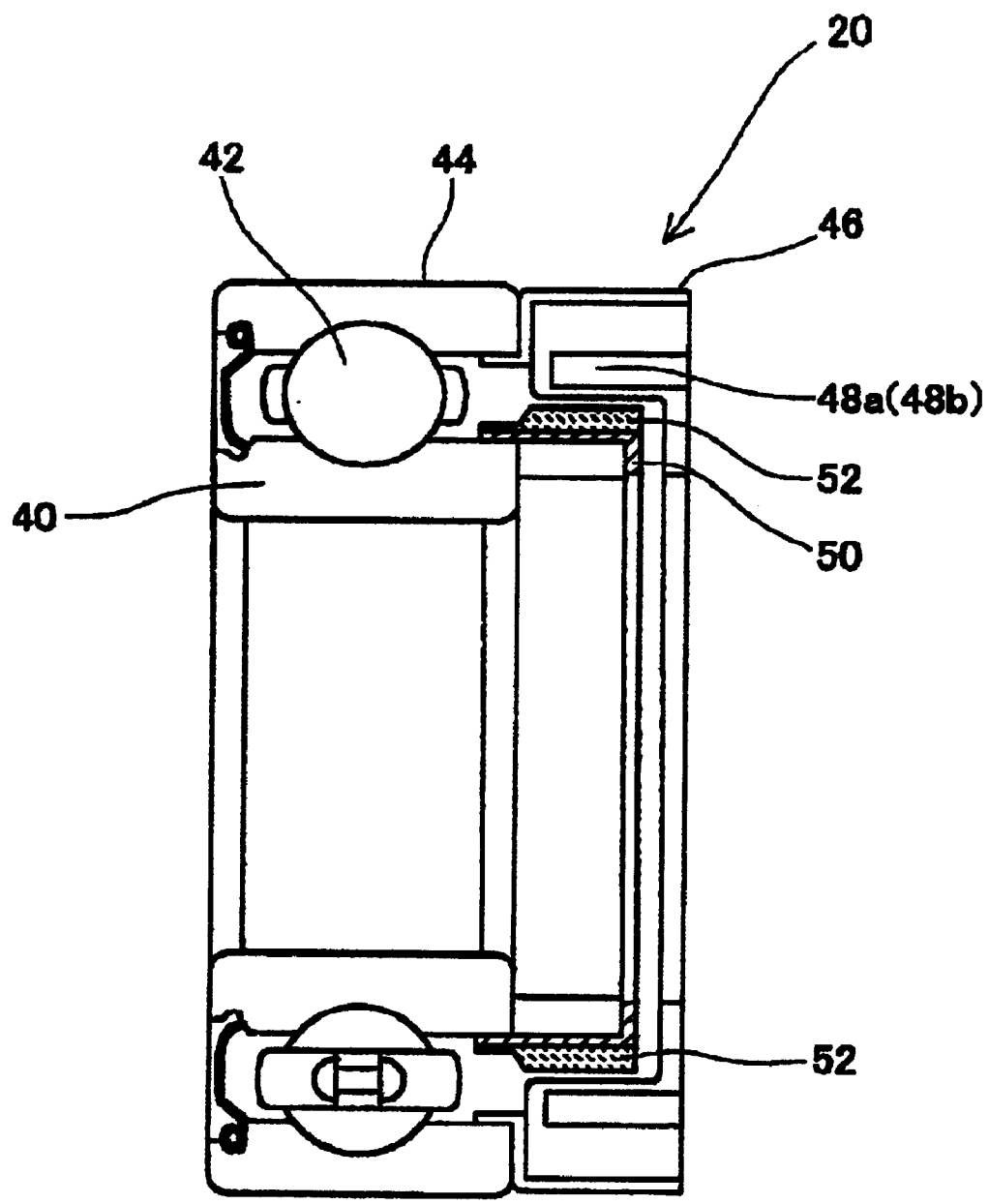
FIG. 12 is a cross-sectional view showing the structure of a representative bearing device.

Representative bearing device 20 will be further explained with reference to FIGS. 12–15. Bearing device 20 rotatably supports output shaft 18 of oil pulse unit 22, which is actuated in the above-described manner. FIG. 12 is a cross-sectional view showing a representative structure for bearing device 20. As shown in FIG. 12, bearing device 20 may include outer cylinder 44, which freely and rotatably supports inner cylinder 40. A through-hole may be defined within inner cylinder 40. The diameter of the through-hole is preferably substantially the same as outside diameter of output shaft 18 of oil pulse unit 22 (i.e., slightly smaller than the outside diameter of output shaft 18). Output shaft 18 of oil pulse unit 22 is firmly inserted into the through-hole from the right side, as viewed in FIG. 12. Thus, inner cylinder 40 is affixed onto output shaft 18. Accordingly, when output shaft 18 rotates, inner cylinder 40 integrally rotates with output shaft 18.

Figure 13:
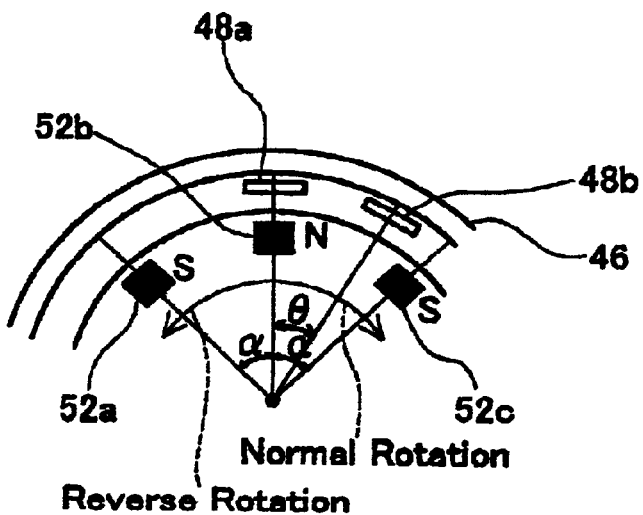
FIG. 13 schematically shows the positional relationships between magnets 52a, 52b, 52c, which disposed within the representative bearing device shown in FIG. 12, and sensors 48a, 48b.

Magnet mounting member 50 may have a cylindrical shape and may be affixed onto the right side of inner cylinder 40, as shown in FIG. 12. A plurality of permanent magnets 52 (i.e., indicated by reference numerals 52a, 52b, 52c in FIG. 13) may be disposed at regular intervals around the outer circumferential (peripheral) surface of magnet mounting member 50. FIG. 13 schematically shows a representative positional relationship between magnets 52, which are disposed within the bearing device 20, and rotational angle detecting sensors, 48a and 48b.

As shown in FIG. 13, magnets 52 may be divided into two groups. One group consists of magnets 52a, 52c, etc., which are disposed such that their respective South poles face outward. The other group consists of magnet(s) 52b, etc., which are disposed such that their respective North poles face outward. That is, the South poles and the North poles are alternately disposed outward. The angle α is defined between adjacent magnets. In other words, the angle α is defined by a line connecting the center of magnet 52a and the rotational center of inner cylinder 40 and a line connecting the center of magnet 52b and the rotational center of inner cylinder 40, as shown in FIG. 13.

Referring back to FIG. 12, outer cylinder 44 is a cylindrical member having an inner diameter that is greater than the outer diameter of inner cylinder 40. A plurality of bearing balls 42 is disposed between inner cylinder 40 and outer cylinder 44 in order to rotatably support inner cylinder 40 relative to outer cylinder 44. Therefore, when outer cylinder 44 is accommodated and affixed within housing 13, inner cylinder 40 (i.e., output shaft 18) is rotatably supported relative to outer cylinder 44 (i.e., housing 13).

Sensor mounting member 46 may have a cylindrical shape and may be affixed to the right side of outer cylinder 44, as viewed in FIG. 12. Rotational angle detecting sensors 48a, 48b may be disposed on the internal wall of sensor mounting member 46. Preferably, sensors 48a, 48b are disposed so as to face magnets 52 (see FIG. 13).

Each rotational angle detecting sensor 48a, 48b may be a latch type Hall IC, which detects changes in magnetic fields. According to the detected changes of the magnetic field, each sensor 48a, 48b switches the state (e.g., voltage level) of a detection signal that is outputted, e.g., to microprocessor 60 (see FIG. 16). For example, rotational angle detecting sensors 48a, 48b may each include a Hall element, which serves as a magnetic sensor, and an IC, which converts output signals from the Hall element into digital signals. For example, when a North-pole magnetic field is applied to each sensor 48a, 48b, the signal output from the sensor may be switched to a HIGH level. When a South-pole magnetic field is applied to each sensor 48a, 48b, the signal output from the sensor may be switched to a LOW level.

Figure 14:
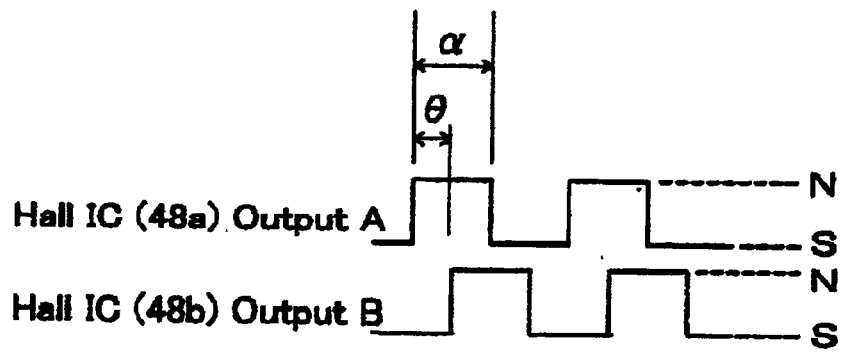
FIG. 14 is a diagram showing the timing of outputted detection signals that are respectively supplied from sensors 48a, 48b when an output shaft is rotated in a normal direction.

Rotational angle detecting sensors 48a, 48b may be displaced from each other by angle θ, as shown in FIG. 13. In this case, when inner cylinder 40 (i.e., output shaft 18) rotates in the normal direction (i.e., a forward or tightening direction), the detection signals that are respectively output from rotational angle detecting sensors 48a, 48b change as shown in FIG. 14. FIG. 14 shows the timings of the outputs of detection signals that are supplied from two corresponding rotational angle-detecting sensors 48a, 48b when output shaft 18 rotates normally (i.e., in the forward direction). For convenience of explanation, the detection signals that are output from rotational angle detection sensors 48a, 48b are switched to the LOW level when magnets 52a, 52c, etc., whose South-poles are disposed outward, face or directly oppose sensors 48a, 48b, and to the HIGH level when magnet(s) 52b, etc., whose North-poles are disposed outward, face or directly oppose sensors 48a, 48b.

For purposes of illustration, rotational angle detecting sensors 48a, 48b and magnets 52a, 52b, and 52c may be positioned, e.g., as shown in FIG. 13, and output shaft 18 may be rotated in the normal (forward or tightening) direction. Because, in FIG. 13, rotational angle detecting sensor 48a faces magnet 52b (i.e., its North pole is disposed outward), the detection signal of sensor 48a is at a HIGH level.

On the other hand, the detection signal of rotational angle detecting sensor 48b is at a LOW level because magnet 52c (i.e., its South pole is disposed outward) has passed detecting sensor 48b. When inner cylinder 40 rotates by angle θ from this state, magnet 52b (i.e., its North pole is disposed outward) faces rotational angle detecting sensor 48b. Therefore, the detection signal of sensor 48b will be switched from the LOW level to the HIGH level.

When inner cylinder 40 further rotates by angle (α-θ), magnet 52a will face rotational angle detecting sensor 48a. Therefore, the detection signal of sensor 48a will be switched from the HIGH level to the LOW level. In the same manner as was describe more fully above, the detection signal of sensor 48b is switched when output shaft 18 rotates (in the normal direction) by angle θ after the detection signal level of sensor 48a is switched.

Figure 15:
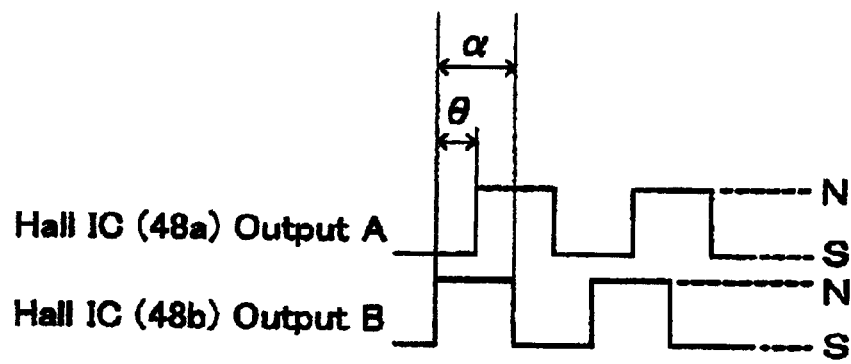
FIG. 15 is a diagram showing the timing of outputted detection signals that are respectively supplied from sensors 48a, 48b when the output shaft is rotated in a reverse direction.

On the other hand, when output shaft 18 rotates in the reverse (or fastener loosening) direction, the detection signal of each of rotational angle detecting sensors 48a, 48b inversely changes as shown in FIG. 15. FIG. 15 shows the timings of the outputs of detection signals that are supplied from two corresponding rotational angle-detecting sensors 48a, 48b when output shaft 18 rotates in the reverse direction. As shown in FIG. 15, the detection signal of rotational angle detecting sensor 48a switches when output shaft 18 rotates (in the reverse direction) by angle θ after the detection signal level of sensor 48b switches.

As was explained above, the (voltage) level of the detection signal of each of rotational angle detecting sensors 48a, 48b is switched each time inner cylinder 40 (i.e., output shaft 18 of oil pulse unit 22) rotates by angle α. Accordingly, each sensor 48a, 48b outputs one pulse each time output shaft 18 rotates by the angle (2 α). The rising edge of each pulse may be detected by microcomputer 60 in order to detect changes in the rotational angle of output shaft 18.

The phases of the detection signals that are output from rotational angle detecting sensors 48a, 48b are shifted from each other by the angle θ. Further, the shifted directions differ according to the rotating direction of output shaft 18. Therefore, the rotating direction of output shaft 18 may be determined based upon the phase shift of the detection signal output from sensors 48a, 48b.

In addition to the components described above, soft impact wrench 11 may include main switch 32 for starting and stopping motor M. Further, detachable battery pack 34 may be removably attached to a lower end of housing 13. Battery pack 34 may supply current to motor M, microcomputer 60, etc.

A representative control circuit for use with soft impact wrench 11 will now be described with reference to FIG. 16. The representative control circuit of soft impact wrench 11 utilizes microcomputer 60 as the main component. Microcomputer 60 is preferably disposed within housing 13.

Figure 16:
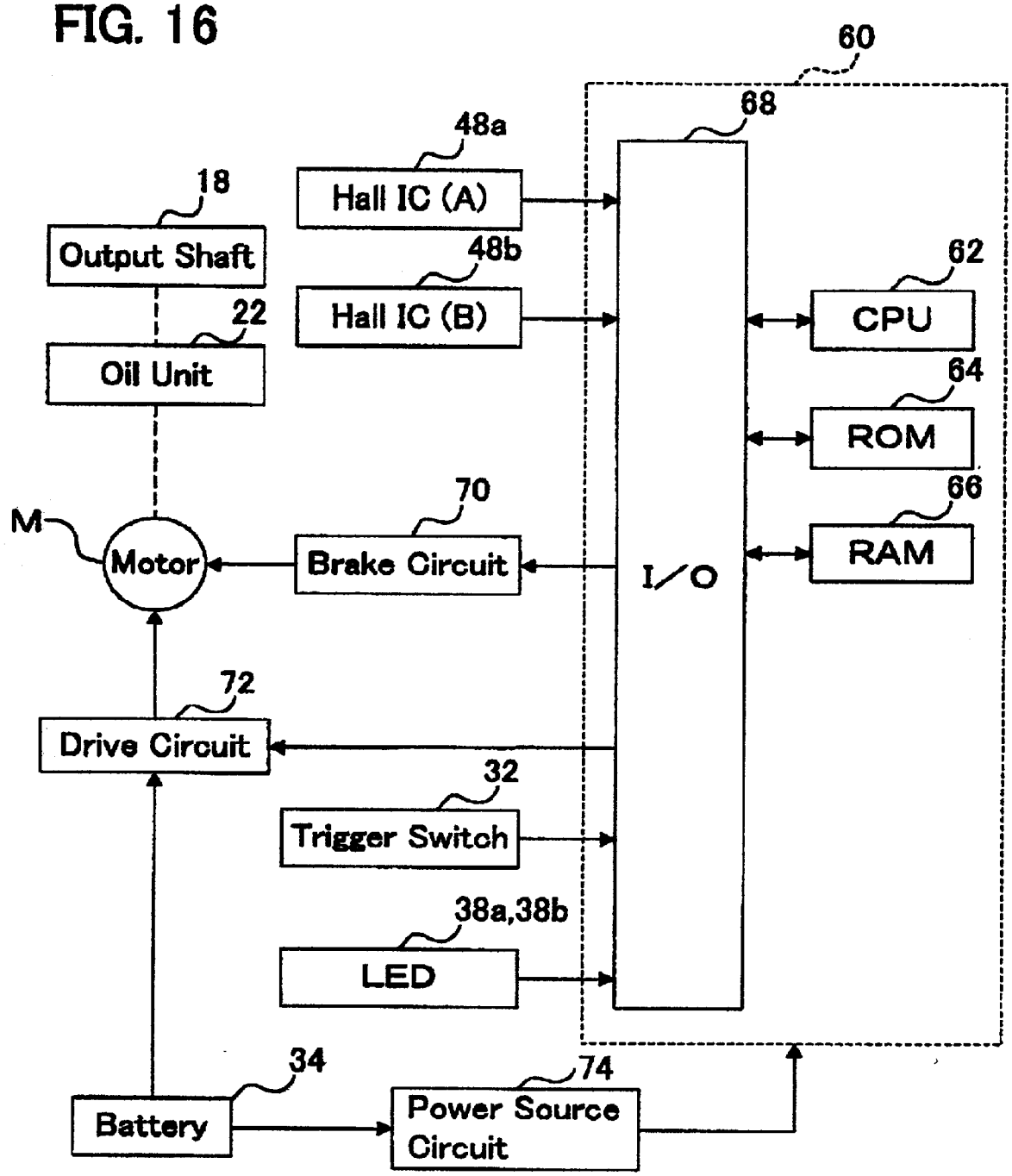
FIG. 16 is a block diagram showing a representative circuit of the right angle soft impact wrench of FIG. 11.

Microcomputer 60 may be an integrated circuit containing CPU 62, ROM 64, RAM 66 and I/O 68, and may be connected as shown in FIG. 16. ROM 64 may store a control program for automatically stopping drive motor M, a remaining battery capacity detecting program, and other programs. Rotational angle detecting sensors 48a, 48b are respectively connected to predetermined input ports of I/O 68. Thus, detection signals output from each of the sensors 48, 48b can be input to microcomputer 60.

Battery pack 34 is connected to microcomputer 60 via power source circuit 74. Battery pack 34 may include the same, or substantially the same, circuits as the battery pack BP of the first representative embodiment (see FIG. 6). The battery voltage of battery pack 34 also may be coupled to an input terminal of microcomputer 60 via an A/D converter (not shown). Thus, the output voltage of battery pack 34 may be supplied to an input terminal of microcomputer 60.

In addition, battery pack 34 is preferably connected to motor M via drive circuit 72. Motor M is connected to microcomputer 60 via drive circuit 72 and brake circuit 70. Light-emitting diodes (LEDs) 38a, 38b may be connected to I/O 68 of microcomputer 60. For example, LED 38a may emit red light and LED 38b may emit green light.

In such a circuit, when motor M is driven, output shaft 18 of oil pulse unit 22 rotates, and detection signals are input to microcomputer 60 from rotational angle detecting sensors 48a, 48b. Microcomputer 60 may execute a program (described below) based upon the input detection signals, stop the supply of power to motor M at a given timing, and actuate brake circuit 70 in order to stop motor M. In addition, when the supply of current to motor M is stopped, microcomputer 60 may detect the remaining battery capacity of battery pack 34 and cause light-emitting diodes 38a, 38b to emit light if the detected remaining battery capacity is less than a predetermined value (i.e., a lower limit for remaining battery capacity).

A representative method for utilizing microcomputer 60 in order to tighten a fastener using soft impact wrench 11 will be described with reference to the representative flowcharts of FIGS. 17–19. For example, in order to tighten a fastener using soft impact wrench 11, the operator may first insert the fastener into the socket attached to the distal end of spindle 12 and then turn ON main (trigger) switch 32. When main switch 32 is turned ON (actuated), microcomputer 60 starts the drive of motor M and also executes the representative control program, which will be discussed below.

In the second representative embodiment, motor M preferably is not driven using maximum power immediately after main switch 32 has been turned ON. Instead, the rotating speed of motor M preferably is gradually increased for a predetermined time period after main switch 32 has been turned ON. Hereinafter, such control will be referred to as a "soft start." Because known soft start processes may be utilized with the present teachings, a detailed explanation of soft start way be omitted.

Figure 17:
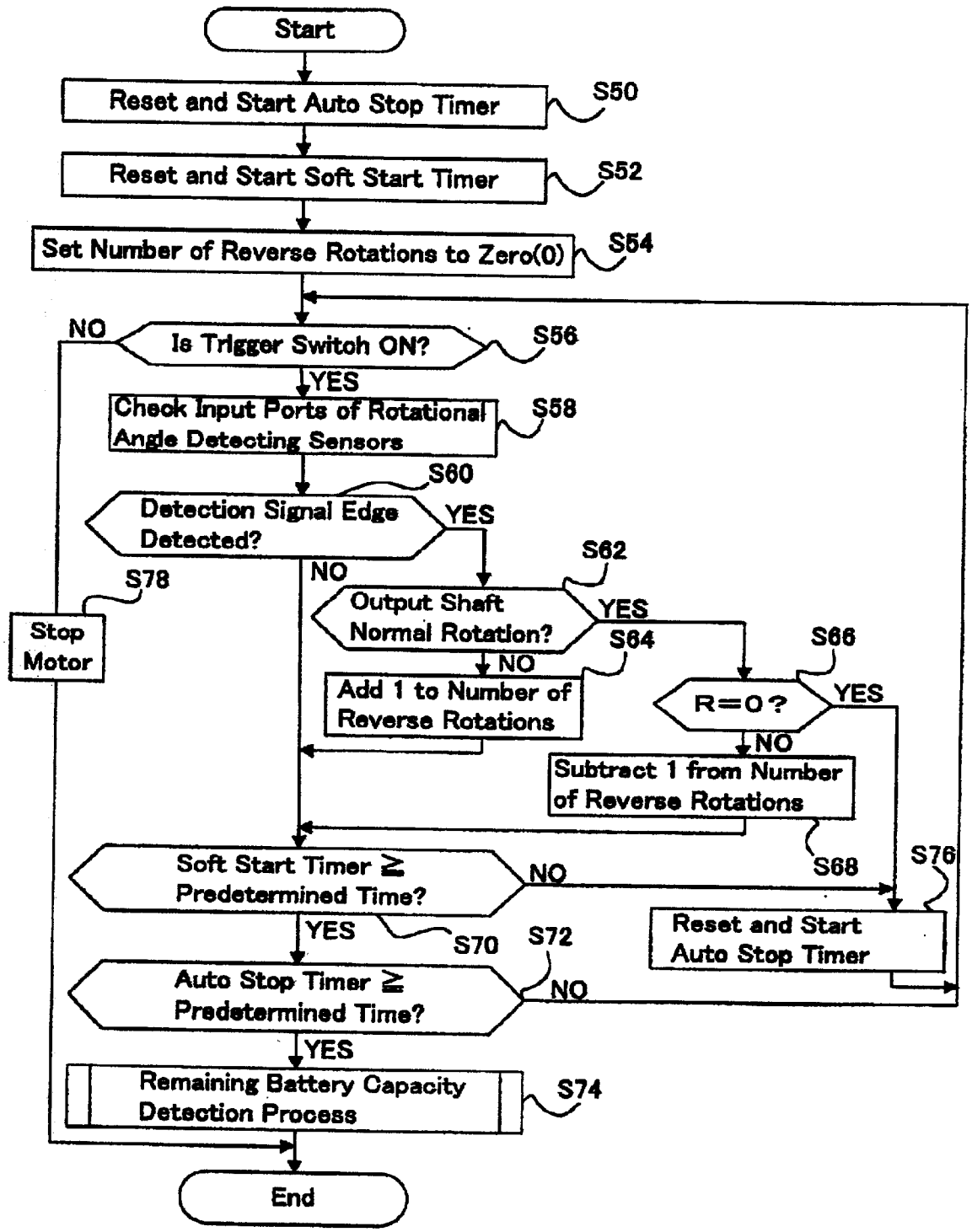
FIG. 17 is a flowchart showing a representative process for automatically stopping the motor when the battery has a relatively low remaining battery capacity.

FIG. 17 is a flowchart illustrating representative steps that may be executed by microcomputer 60 according to the present teachings. Referring to FIG. 17, when main switch 32 is turned ON, microcomputer 60 resets an auto stop timer and starts counting (step S50). The auto stop timer is used for determining whether or not motor M should be stopped. When the auto stop timer has counted to a predetermined value (number), current supply to motor M is automatically stopped.

After the auto stop timer is set to an initial state, a soft start timer is reset and starts counting (step S52). The soft start timer is used for determining whether or not the current supply to motor M is being controlled according to a soft start control. Then, the value of variable R is cleared (e.g., set to zero) in RAM 66 (step S54). For example, R may store the number of reverse rotation(s) by output shaft 18. Thereafter, microcomputer 60 determines whether or not trigger (main) switch 32 is ON (step S56).

If main switch 32 is not ON (i.e., NO in step S56), the motor is stopped, e.g., by cutting the supply of current to the motor, (step S78) and the process ends. Accordingly, if the operator turns ON main switch 32 and thereafter turns OFF main switch 32 while tightening a fastener, motor M stops even if the fastener has not yet been completely tightened. In this case, although the remaining battery capacity preferably is not detected, the process naturally may be modified to detect the remaining battery capacity.

On the other hand, if main switch 32 is ON (i.e., YES in step S56), any detection signals that are being output by the respective rotational angle detecting sensors 48a, 48b will be checked (step S58). For example, the states of the input ports that respectively receive the detection signals of sensors 48a, 48b may be checked in order to detect pulse edges of the detection signals (i.e., rising of detection signals).

In step S60, microcomputer 60 determines whether or not one or more pulse edges of the detection signals were detected in step S58. If pulse edges of the detection signals have not been detected (i.e., NO in step S60), microcomputer 60 determines whether or not the soft start has finished (step S70). For example, microcomputer 60 determines whether or not the soft start timer, which started counting in step S52, has exceeded the predetermined time period (i.e., the length of time that motor M is driven according to the soft start program or procedure).

If the soft start has finished (i.e., YES in step S70), the process proceeds to step S72. On the other hand, if the soft start has not finished (i.e., NO in step S70), the auto stop timer is reset and restarted (step S76), and then the process returns to step S56.

In step S72, the microcomputer 60 determines whether or not the time (number) counted by the auto stop timer is equal to a predetermined time (number). If the time counted by the auto stop timer is greater than or equal to the predetermined time (i.e., YES in step S72), microcomputer 60 proceeds to step S74 in order to perform the remaining battery capacity detection process (described below in further detail). On the other hand, if the time counted by the timer is not greater than or equal to the predetermined value (i.e., NO in step S72), microcomputer 60 returns to step S56 in order to repeat the process starting from step S56.

In the second representative embodiment, because the auto stop timer is reset when microcomputer 60 determines that the soft start has not yet finished, motor M is not automatically stopped by microcomputer 60. This feature prevents motor M from being stopped during a soft start, which might result in tightening the fastener using insufficient torque.

Conversely, if a pulse edge of the detection signal output from rotational angle detecting sensor 48a or 48b is detected (i.e., YES in step 60), microcomputer 60 determines whether the rotating direction of output shaft 18 is normal (forward) or reverse (step S62). For example, the rotating direction (i.e., normal or reverse) of output shaft 18 may be determined based upon the phase difference between the detection signal (i.e., pulse edge) of rotational angle detecting sensor 48a and the detection signal (i.e., pulse edge) of rotational angle detecting sensor 48b. As shown in FIG. 14, if rising edge of the detection signal from sensor 48b follows the rising edge of the detection signal from sensor 48a by phase (angle) θ, microcomputer 60 determines that the output shaft 18 is rotating in the normal direction. On the other hand, as shown in FIG. 15, if rising edge of the detection signal from sensor 48a follows the rising edge of the detection signal from sensor 48b by phase (angle) θ, microcomputer 60 determines that output shaft 18 is rotating in the reverse direction.

If output shaft 18 is not rotating in the normal direction (i.e., NO in step S62), thereby indicating that output shaft 18 is rotating in the reverse direction, the value 1 is added to variable R, which is used for storing the number of reverse rotation(s) (step S64). Then, the process proceeds to step S70. Thus, if the soft start has finished (i.e., YES in step S70), the auto stop timer is not reset and instead continues to count.

On the other hand, if output shaft 18 has been rotating in the normal direction (YES in step S62), microcomputer 60 determines whether or not the stored number R of reverse rotation(s) is 0 (step S66). As noted above, in tightening tools, even after the rotation (tightening) of a fastener has substantially stopped, output shaft 18 may repeat the cycle of normal rotation and reverse rotation due to the hammering action (impact). Therefore, when output shaft 18 has been rotating in the normal direction, the microcomputer 60 must determine whether the fastener has been tightened by the normal rotation of output shaft 18 or whether output shaft 18 has returned to the initial position due to the hammering action or other factors. Therefore, microcomputer 60 may preferably determine whether or not the number R of reverse rotation(s) is 0 in order to determine whether or not the fastener has been tightened due to normal rotation of output shaft 18.

For example, if output shaft 18 was rotating in the normal direction when the number R of reverse rotation(s) was 0, microcomputer 60 determines that the fastener has yet been completely tightened by the normal rotation of output shaft 18. On the other hand, if output shaft 18 is rotating in the normal direction when the number R of reverse rotation(s) is not 0, microcomputer 60 may determine that the fastener has not yet been tightened due to the normal rotation of output shaft 18. Instead, microcomputer 60 may determine that output shaft 18 has returned to the initial position (the position before reverse rotation). That is, output shaft 18 has stopped.

If the stored number R of reverse rotation(s) is not 0 (i.e., NO in step 66), microcomputer 60 determines that output shaft 18 has returned to the initial position (the position before reverse rotation) due to normal rotation. Therefore, microcomputer 60 subtracts 1 from the stored number R of reverse rotation(s) (step S68) and proceeds to step S70. Accordingly, if the soft start has finished, microcomputer 60 proceeds to step S72 in order to determine whether or not the time (number) counted by the auto stop timer is greater than or equal to the predetermined time (number). If output shaft 18 has rotated in the normal direction, but this rotation has not further rotated the fastener in the normal direction (i.e., if hammering has occurred), microcomputer 60 determines whether or not the time (number) counted by the auto stop timer is greater than or equal to the predetermined time (number).

On the other hand, if the stored number R of reverse rotation(s) is 0 (i.e., YES in step S66), microcomputer 60 determines that the fastener has been tightened due to normal rotation of output shaft 18. Then, the process proceeds to step S76, in which the auto stop timer is reset and restarted, and thereafter returns to step S56.

In step S74, microcomputer 60 performs a remaining battery capacity detection process, which will now be described in further detail with reference to FIG. 18. FIG. 18 is a flowchart illustrating a representative process for detecting the remaining battery capacity for this second representative embodiment.

Figure 18:
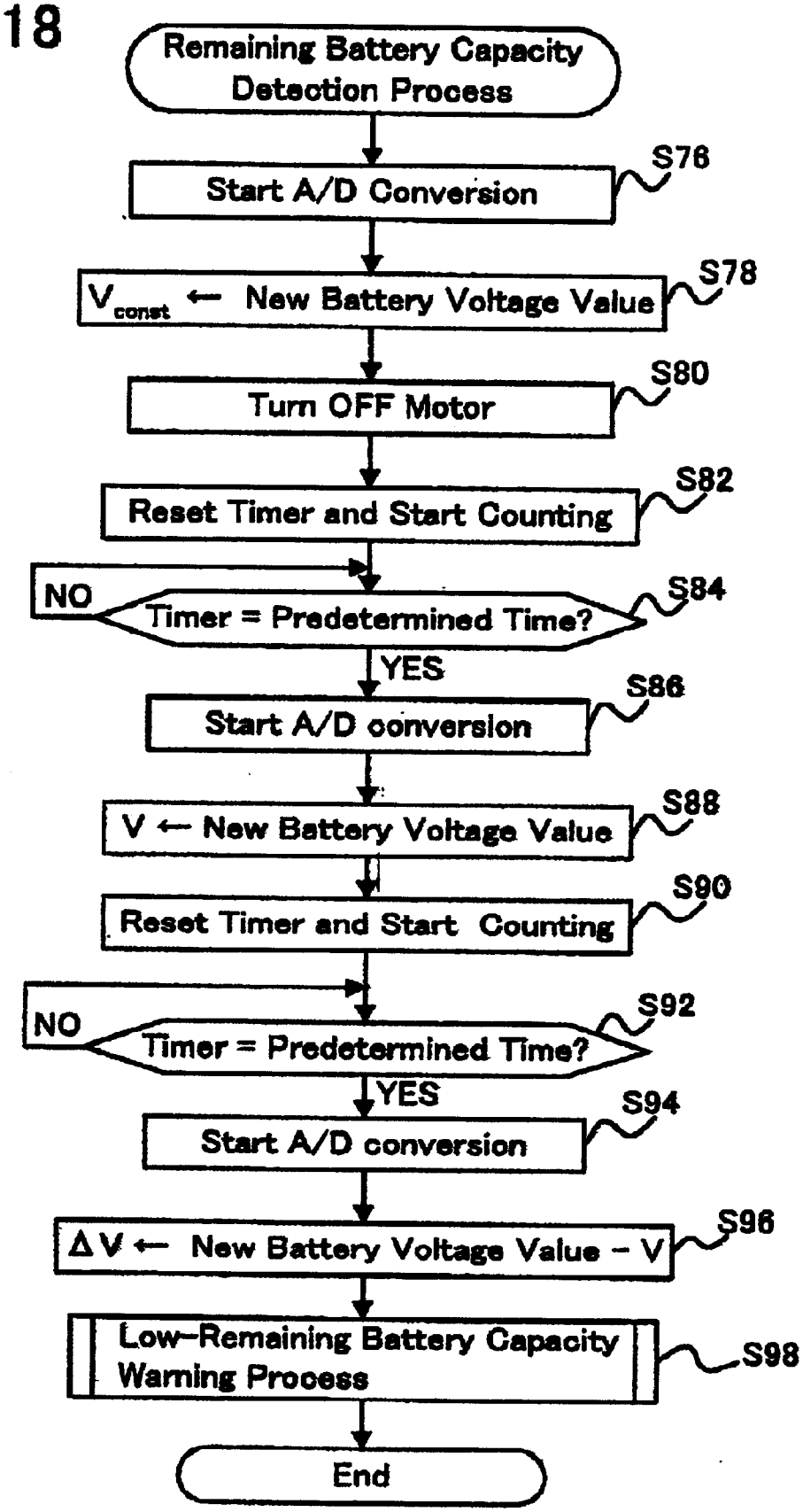
FIG. 18 is a flowchart showing a representative process for detecting remaining battery capacity.

As shown in FIG. 18, microcomputer 60 may first convert the analog output voltage of battery pack 34 into a digital value using an A/D converter (step S76). The value obtained by the A/D conversion, which represents a constant current discharge voltage Vconst, may then be stored at a given address in RAM 66 (step S78). Thus, the output voltage of battery pack 34 when output shaft 18 is not substantially rotating (i.e., when output shaft 18 is repeating the cycle of normal rotation and reverse rotation but the fastener is not being tightened) is stored in RAM 66. When output shaft 18 is not rotating (or not substantially rotating), the rotating speed of motor M is generally constant and a substantially constant current is supplied to motor M.

After constant current discharge voltage Vconst has been stored in RAM 66, the supply of current to motor M may be stopped, so that motor M will stop rotating (step S80). Then, the timer starts counting (step S82) and the process waits until the timer counts to a (first) predetermined time (number) (step S84).

After the timer has counted to the predetermined time, the analog output voltage of battery pack 34 is again converted into a digital value (step S86). The value obtained by the A/D conversion, which represents a recovery voltage V, may then be stored in RAM 66 (step S88). Subsequently, the timer is again reset in order to start counting again (step S90) and the process waits until the timer counts to a new (second) predetermined time (number) (step S92).

After the timer has finished counting, the analog output voltage of battery pack 34 is again converted into a digital value (step S94). Then, the recovery voltage V (stored in step S88) is subtracted from the voltage detected in step S94. The result of this subtraction, which represents a voltage change value $\Delta V$, may be stored at a given address in RAM 66 (step S96).

If the voltage change value $\Delta V$ and the constant current discharge voltage Vconst are stored in RAM 16 in the above-described manner, a warning program may be executed using this information in order to advise the power tool operator of the remaining battery capacity of battery pack 34 (step S98). A representative warning program will be described below with reference to the flowchart shown in FIG. 19.

Figure 19:
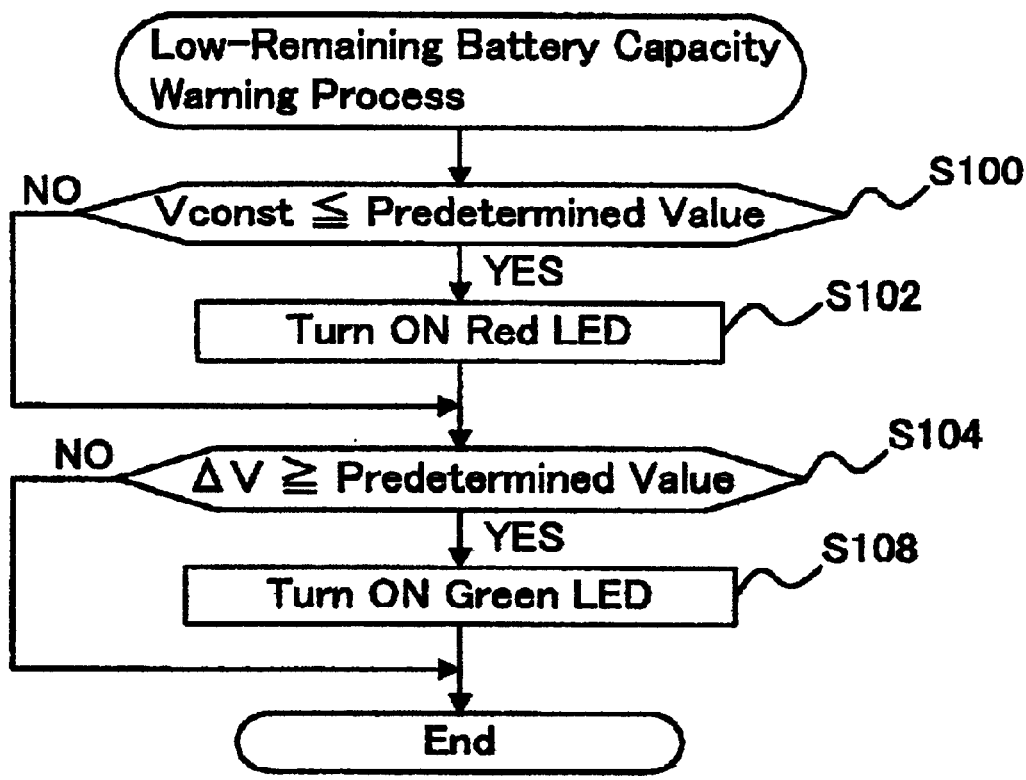
FIG. 19 is a flowchart showing a representative process for informing a power tool operator of low remaining battery capacity.

Referring to FIG. 19, microcomputer 60 first determines whether or not the constant current discharge voltage Vconst is less than or equal to a predetermined value (step S100). If the constant current discharge voltage Vconst is less than or equal to the predetermined value (YES in step S100), LED 38a, which may emit red light, may be illuminated (step S102). On the other hand, if the constant current discharge voltage Vconst exceeds the predetermined value (NO in step S100), the process proceeds to step S104.

In step S104, microcomputer 60 determines whether the voltage difference $\Delta V$ is greater than or equal to a predetermined value (step S104). This predetermined value may be equivalent to the predetermined value used in step S21 in the first representative embodiment (see FIG. 8). If the voltage difference $\Delta V$ is greater than or equal to the predetermined value (YES in step 104), LED 38b, which may emit green light, may be illuminated (step S108). On the other hand, if the voltage difference $\Delta V$ is less than or equal to the predetermined value (NO in step S104), the process ends.

Thus, when the battery voltage, which is detected during the constant current discharge state, indicates a low remaining battery capacity, red LED 36a may be lit. On the other, when the voltage recovery characteristics indicate a low remaining battery capacity, green LED 36b may be lit. Therefore, the operator can be informed that battery pack 34 is in an abnormal state by the different color lights that are selectively emitted from LEDs 38a, 38b. Therefore, the operator can take appropriate action to remedy the abnormal state.

For example, when both LEDs 38a, 38b are lit, the operator can determine that the remaining battery capacity of battery pack 34 has just decreased below the predetermined level. Therefore, the operator may remove and recharge battery pack 34. However, when red LED 38a is turned ON but green LED 38b remains OFF, the operator can determine, e.g., that a short circuit may have occurred in one or more cells of battery pack 34. Therefore, the operator may replace battery pack 34 with another battery pack. Further, when red LED 38a remains off but green LED 38b is turned ON, the operator can determine, e.g., that the battery pack 34 requires a refresh operation in order to eliminate memory effects.

Figure 20A:
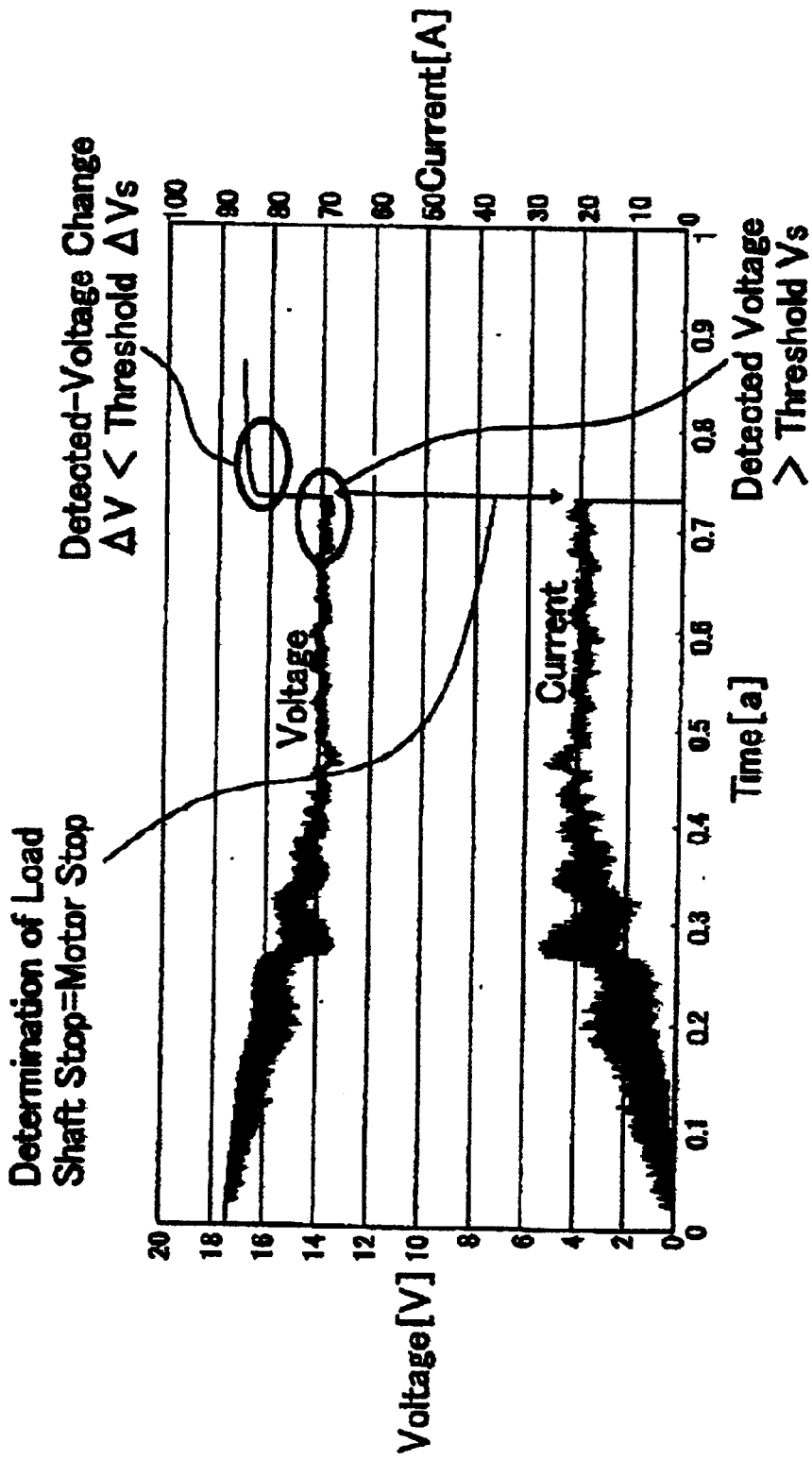
FIG. 20(a) is a graph showing changes in the voltage and current of a fully charged battery over time when the soft impact wrench of the second embodiment performs a tightening operation.
Figure 20B:
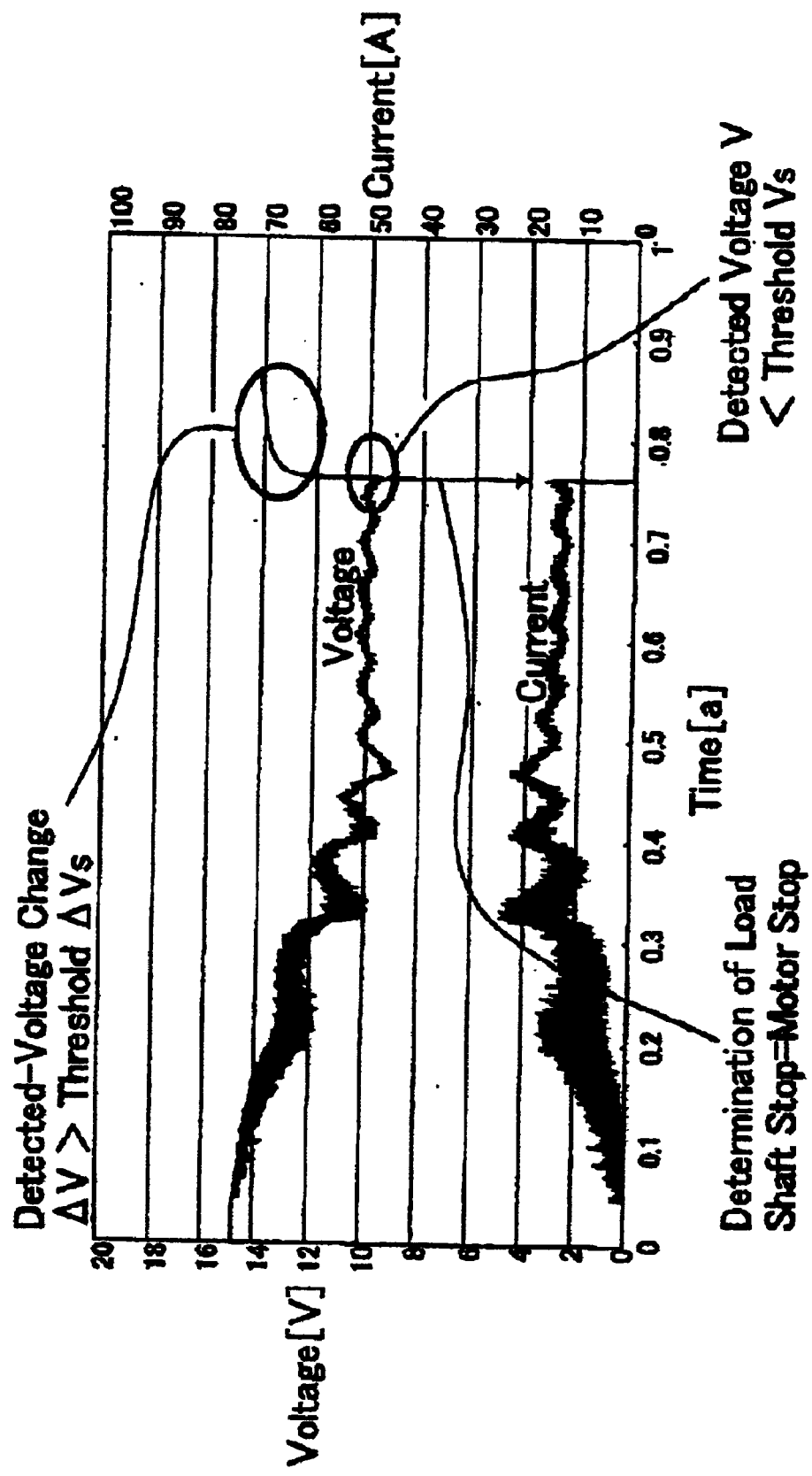
FIG. 20(b) is a graph showing changes in the voltage and current of a low remaining capacity battery over time when the soft impact wrench of the second embodiment performs a tightening operation.

FIGS. 20(a) and 20(b) show changes in the voltage of battery pack 34 over time and changes in the current supplied by battery pack 34 over time when a tightening operation is performed using soft impact wrench 11. FIG. 20(a) shows the voltage and current changes over time when battery pack 34 is fully charged. FIG. 20(b) shows the voltage and current changes over time when the remaining battery capacity of battery pack 34 is relatively low.

Regardless of whether battery pack 34 is fully charged or the remaining capacity of battery pack 34 is low, the voltage of battery pack 34 will gradually decrease after main switch 32 is turned ON. In fact, the voltage may become nearly or substantially constant over time, as shown in FIGS. 20(a), 20(b). The current supplied by battery pack 34 also will gradually increase over time and also may become nearly or substantially constant over time.

When output shaft 18 has stopped (i.e., near the end of the tightening operation), the output voltage of fully charged battery pack 34 is about 14V. However, when its remaining battery capacity is low or relatively low, the output voltage of battery pack 34 is about 10V, as can be determined by comparing FIG. 20(a) with FIG. 20(b). In the second representative embodiment, the remaining battery capacity of battery pack 34 may be determined by using this difference in output battery voltages.

In addition, after motor M has stopped rotating (i.e., after the current supply to motor M is stopped), the voltage of fully charged battery pack 34 quickly recovers, as shown in FIG. 20(a). On the other hand, the voltage of battery pack 34 when its remaining capacity is low recovers more slowly, as shown in FIG. 20(b). In the second representative embodiment, the remaining battery capacity of battery pack 34 may also be determined by using this difference in battery voltage recovery speed.

When the remaining battery capacity of battery pack 34 is determined using the above-described differences, LEDs 38a, 38b may be selectively illuminated in order to inform the power tool operator of the battery condition.

As noted above, various modifications may be made to the present teachings. For example, the techniques of the present teachings can be applied to other tightening tools (e.g., tools for tightening screws in order to join wood pieces), which do not completely stop the rotation of the screw. In this case, by adjusting the predetermined value that is set for the auto stop timer, the motor can be stopped when the rotating speed of the screw reaches a predetermined speed. That is, if the predetermined value for the auto stop timer is reduced, the motor will be stopped when the rotating speed of the screw reaches the predetermined speed, because the rotation of the screw is not detected during that period of time that the auto stop timer is counting to the predetermined value.

In addition, the rotation of motor M may be stopped after the predetermined time has elapsed. The predetermined time may be counted by the auto stop timer, which is actuated after the fastener was stopped. In this case, because the fastener continues to be tightened for the predetermined period of time after the fastener substantially stops rotating, it is possible to more reliably prevent the application of an insufficient tightening torque to the fastener.

Further, the techniques of the present teachings can also be applied to tightening tools that count impacts (strikes) exerted on the load shaft. For example, the current supply to the motor can be stopped when the number of impacts reaches a predetermined number. In this embodiment, a sound sensor, which detects impact sounds, may be additionally provided in order to detect the number impacts that are applied to the load shaft. Further teachings concerning this additional feature may be found in US Published Patent Application No. 2002-0050364, the teachings of which are incorporated herein by reference as if fully set forth herein.

As a further modification, whether or not the rotation of a fastener (e.g., a bolt, a nut, or a screw) has stopped may be determined based upon the rotational direction of the load shaft and changes in the rotational angle of the load shaft. For example, when the sound sensor detects a predetermined number of impact sounds after the rotation of the fastener has stopped, the current supply to the motor may be stopped. Accordingly, if an impact is generated before the fastener has been properly seated on the workpiece, e.g., due to the presence of a burr or a similar defect in the fastener, the impact before proper seating of the fastener is not counted. Therefore, uniform tightening torque for the fastener is ensured, which improves the accuracy of the tightening torque.

In the second representative embodiment, an oil unit is utilized as the impact generating means or means for generating an elevated torque. However, various other means may also be used as the impact generating means. For example, the present teachings may also be applied to tightening tools having a mechanical impact generating means in which a hammer impacts an anvil, as described in more detail in the above-noted US Published Patent Application No. 2002-0050364.

Further, in power tools that can switch between normal rotation and reverse rotation, an abnormal state caused as by erroneous wiring installed during the assembly process can be detected by comparing the input of a change-over switch with a direction of the rotation of the output shaft, which is detected by each of rotational angle detecting sensors.

Furthermore, although light-emitting diodes (LED) were utilized in the representative embodiments in order to indicate the various possible conditions of the battery, other displays (e.g., a liquid crystal display ("LCD") naturally may be utilized to indicate the battery conditions using words or graphical symbols.

Moreover, although LEDs were utilized in the representative embodiments in order to inform the power tool operator that the remaining battery capacity is low or that the battery pack may be in an abnormal state, other means for displaying this information (warning) may be utilized with the present teachings. For example, a flat panel display, such as a liquid crystal display, may be utilized to display the warning information. In this case, the warning means may be display using words or other graphical symbols, such as icons. Naturally, other types of visual warning means may be readily utilized.

In addition, audible warning means may be utilized together with such visual warning means or instead of the visual warning means. For example, one or more buzzers may be utilized to generate a warning sound when an abnormal condition is detected and/or when the battery is due for recharging. Naturally, the audible warning means may include any type of device that will reliably inform the power tool operator of the battery condition.

Although FIGS. 1 and 3–5 show analog comparator 5, naturally digital comparators may be advantageously utilized with the present teachings. It is noted that the comparison function is more significant to the present teachings than the actual type of device that performs the comparison function. Thus, the present teachings are not limited to any particular type of comparators.

What is claimed is:

1. A battery-powered tool, comprising:

a rechargeable battery, a drive source for generating power using current supplied from the battery, a switch electrically connecting and disconnecting the battery with the drive source, a voltage detector detecting the output battery voltage of the battery; and means for determining whether a voltage difference between (1) a first output battery voltage detected at a first predetermined time period after the switch is turned OFF and (2) a second output battery voltage detected at a second predetermined time period after the first predetermined time period exceed a first predetermined value, thereby determining whether the battery has sufficient remaining battery capacity for further operation, wherein the switch has been maintained OFF until the first and second predetermined time periods have elapsed.

2. A battery-powered tool as in claim 1, wherein the switch comprises:

a first switch that is manually operable and a second switch that is intermittently turned ON and OFF in order to increase or decrease current per unit time supplied by the battery to the drive source.

3. A battery-powered tool as in claim 2, wherein the determining means begins counting the first predetermined time period after the first switch has been turned OFF.

4. A battery-powered tool as in claim 3, wherein the drive source comprises a motor, and wherein the determining means begins counting the first predetermined time period if the first switch was turned OFF hen a substantially constant current was being supplied to the motor.

5. A battery-powered tool as in claim 4, further comprising a first means for warning an operator that the battery has insufficient remaining battery capacity for further operation, the first warning means being connected to the determining means, wherein the determining means actuates the first warning means when the voltage difference exceeds the first predetermined value.

6. A battery-powered tool as in claim 5, further comprising:

a second means for warning an operator that the battery has insufficient remaining battery capacity for further operation and means for actuating the second warning means when a third output battery voltage, which is detected when a substantially constant current is being supplied to the motor, is less than a second predetermined value.

7. A battery-powered tool as in claim 2, wherein the determining means begins counting the first predetermined time period after the second switch has been turned OFF.

8. A battery powered tool as in claim 7, further comprising a switching circuit arranged and constructed to repeatedly switch the second switch between an ON-state and an OFF-state, wherein the switching circuit is arranged and constructed to (A) turn ON the second switch when the first switch is turned ON, and (B) turn OFF the second switch after the battery voltage applied to the drive source has stabilized.

9. A battery-powered tool as in claim 8, wherein the drive source comprises a motor having a time constant, an wherein the time period between when the second switch is turned ON and when the second switch is turned OFF is greater than or equal to the time constant of the motor.

10. A battery-powered tool as in claim 8, wherein the drive source comprises a motor, and wherein the switching circuit is further arranged and constructed to (A) turn ON the second switch when the first switch is turned ON, and (B) turn OFF the second switch before the motor starts rotating.

11. A battery-powered tool as in claim 10, further comprising a first means for warning an operator that the battle has insufficient remaining battery capacity for further operation, the first warning means being connected to the determining means, wherein the determining means actuates the first warning means when the voltage difference exceeds the first predetermined value.

12. A battery-powered tool as in claim 11, wherein the second switch is maintained OFF when determining means actuates the first warning means.

13. A battery-powered tool as in claim 12, further comprising:

a third means for warning operator that the battery has insufficient remaining battery capacity for further operation, and means for actuating the third warning means when a fourth output battery voltage, which is detected during the time period between (A) turning ON the first switch and (B) turning ON the second switch, is less than a third predetermined value.

14. A battery-powered tool as in claim 13, wherein the second switch is maintained OFF when the actuating means is actuating the third warning means.

15. A battery-powered tool as in claim 11, further comprising:

a fourth means for warning an operator that the battery has insufficient remaining battery capacity for further operation and means for actuating the fourth warning means when a difference between (i) a fourth output battery voltage, which is detected during the time period between (A) turning ON the first switch and (B) turning ON the second switch, and (ii) a fifth battery voltage, which is detected when a predetermined time has elapsed after the second switch is turned ON, exceeds a fourth predetermined value.

16. A battery-powered tool as in claim 15, wherein the second switch is maintained OFF when the actuating means is actuating the fourth warning means.

* * * * *